(12) United States Patent  
Barton et al.

(10) Patent No.: US 9,094,718 B2  
(45) Date of Patent: Jul. 28, 2015

(54) CUSTOMIZING DVR FUNCTIONALITY

(71) Applicant: TiVo Inc., Alviso, CA (US)

(72) Inventors: James M. Barton, Los Gatos, CA (US); Brian Beach, Columbus, IN (US); Margret Schmidt, Redwood City, CA (US); Robert F. Poniatowski, San Jose, CA (US); Shelly Glennon, San Jose, CA (US)

(73) Assignee: TiVo Inc., Alviso, CA (US)

( * ) Notice: Subject to any disclaimer, the term of this patent is extended or adjusted under 35 U.S.C. 154(b) by 0 days.

(21) Appl. No.: 14/043,738

(22) Filed: Oct. 1, 2013

(65) Prior Publication Data

US 2014/0033245 A1 Jan. 30, 2014

Related U.S. Application Data

(63) Continuation of application No. 12/950,898, filed on Nov. 19, 2010, now Pat. No. 8,549,553, which is a continuation of application No. 11/713,242, filed on Mar. 1, 2007, now Pat. No. 7,861,258.

(60) Provisional application No. 60/778,596, filed on Mar. 1, 2006.

(51) Int. Cl.
*H04N 7/10* (2006.01)
*H04N 7/025* (2006.01)
(Continued)

(52) U.S. Cl.
CPC .......... *H04N 21/4542* (2013.01); *G11B 27/105* (2013.01); *H04N 5/44543* (2013.01); *H04N 5/76* (2013.01); *H04N 7/163* (2013.01); *H04N 21/4147* (2013.01); *H04N 21/42646* (2013.01); *H04N 21/458* (2013.01); *H04N 21/4532* (2013.01); *H04N 21/4751* (2013.01); *H04N 21/4753* (2013.01); *H04N 21/4755* (2013.01); *H04N 21/47214* (2013.01); *H04N 5/765* (2013.01); *H04N 5/775* (2013.01);
(Continued)

(58) Field of Classification Search
USPC ........................ 725/25, 2, 32, 348, 28, 34–36
See application file for complete search history.

(56) References Cited

U.S. PATENT DOCUMENTS 7,206,497 B1 4/2007 Boyle et al.
7,337,219 B1 2/2008 Meenan et al.
(Continued)

FOREIGN PATENT DOCUMENTS

WO WO2004/003879 A2 1/2004

OTHER PUBLICATIONS

European Patent Office, Office Action dated Mar. 5, 2013, received in European Patent Application No. 07752175.5, 5 pages.
(Continued)

*Primary Examiner* — Mulugeta Mengesha
(74) *Attorney, Agent, or Firm* — Wong & Rees LLP

(57) ABSTRACT

Techniques described herein automatically identifies, in a multimedia content, an advertiser from which an advertisement in the multimedia content originates and/or a brand to which the advertisement pertains. The system determines whether the identified advertiser and/or identified brand is specified in a not to be displayed list and if so, performs at least one of: presents alternative content during the time interval that the advertisement occupies in the multimedia content or skips over the advertisement in the multimedia content.

21 Claims, 34 Drawing Sheets

(51) Int. Cl.

| | | |
|---|---|---|
| *H04N 21/454* | (2011.01) | |
| *G11B 27/10* | (2006.01) | |
| *H04N 5/445* | (2011.01) | |
| *H04N 5/76* | (2006.01) | |
| *H04N 7/16* | (2011.01) | |
| *H04N 21/4147* | (2011.01) | |
| *H04N 21/426* | (2011.01) | |
| *H04N 21/45* | (2011.01) | |
| *H04N 21/458* | (2011.01) | |
| *H04N 21/472* | (2011.01) | |
| *H04N 21/475* | (2011.01) | |
| *H04N 5/765* | (2006.01) | |
| *H04N 5/775* | (2006.01) | |
| *H04N 5/781* | (2006.01) | |
| *H04N 5/85* | (2006.01) | |
| *H04N 9/79* | (2006.01) | |
| *H04N 9/804* | (2006.01) | |
| *H04N 21/41* | (2011.01) | |
| *H04N 21/488* | (2011.01) | |

(52) U.S. Cl.
CPC ............... *H04N 5/781* (2013.01); *H04N 5/85* (2013.01); *H04N 9/7921* (2013.01); *H04N 9/8042* (2013.01); *H04N 21/4104* (2013.01); *H04N 21/488* (2013.01)

(56) References Cited

U.S. PATENT DOCUMENTS

| 7,503,055 | B2 * | 3/2009 | Reynolds et al. ............ 725/32 |
|---|---|---|---|
| 2003/0154485 | A1 | 8/2003 | Johnson et al. |
| 2003/0229898 | A1 | 12/2003 | Babu et al. |
| 2004/0006698 | A1 | 1/2004 | Apfelbaum |
| 2004/0008972 | A1 | 1/2004 | Haken |
| 2004/0098743 | A1 | 5/2004 | Gutta et al. |
| 2005/0076359 | A1 * | 4/2005 | Pierson et al. ............ 725/32 |
| 2005/0114340 | A1 | 5/2005 | Huslak et al. |
| 2006/0161950 | A1 | 7/2006 | Imai et al. |
| 2006/0215990 | A1 | 9/2006 | Proebstel |

OTHER PUBLICATIONS

Claims as of Mar. 5, 2013 in European Patent Application No. 07752175.5, 3 pages.

Australian Government, IP Australia, Patent Examination Report No. 1. In application No. 2011200014, dated Oct. 15, 2012, 3 pages.

Current Claims in application No. 2011200014, dated Oct. 2012, 2 pages.

The State Intellectual Property Office of the People's Republic of China Notification of the Third Office Action received in Chinese patent application No. 200780014835.0, mail date Sep. 6, 2012, 5 pages.

Claims as of Sep. 6, 2012, in Chinese Patent application No. 200780014835.0, 10 pages.

Canadian Intellectual Property Office, Office Action, in application No. 2,641,750, dated Sep. 24, 2012, 2 pages.

Current Claims in application No. 2,641,750, dated, Sep. 2012, 5 pages.

The State Intellectual Property Office of the People's Republic of China Notification of Decision of Rejection received in Chinese patent application No. 200780007271.8, mail date Jun. 5, 2012, 7 pages.

European Patent Office, Office Action received in European patent application No. 07750022.1, mail date Jun. 5, 2012, 6 pages.

Claims as of Jun. 5, 2012 in European patent application No. 07750022.1, 6 pages.

IP Australian Government, Patent Examination Report No. 1 in application No. 2010257254, dated Sep. 19, 2013, 3 pages.

Current Claims in application No. 2010257254, dated Sep. 2013, 6 pages.

Chinese Patent Office, Application No. 201210352893.7, Foreign Office Action dated Nov. 7, 2014.

Chinese Patent Office, Application No. 201210352893.7, Pending Claims as of Nov. 7, 2014.

* cited by examiner

FIG. 2
200
TiVo Central
Now Playing List
Watch Live TV
Pick Programs to Record
Music, Photos, Products, & More
Showcases & TV Guide® 202
 Messages & Settings
 Got Kids? Set up Kids Zone! 201
 The Apprentice: Go behind the scenes!
 Watch the King Kong Movie Trailer

FIG. 4
400

Enable Kids Zone?

Do you want to enable Kids Zone?

If you enable Kids Zone, your kids will only be able to see shows (in Now Playing and Live TV) that they have permission to watch. They will not be able to see or delete your shows, or set up any new recordings.

To exit Kids Zone, you will need to enter your password.

Yes, enable Kids Zone  401

No, thank you  402

FIG. 5
500

Choose Age Range

In order to tailor Kids Zone content for your children, please pick the age range most appropriate for your household. This will set ratings limits and create a Kids Channel List. (You can edit this list later in Kids Zone Settings.)

| Under 4 years old    501 |
|---|
| Ages 4 to 7 years old    502 |
| Ages 7 to 12 years old    503 |

600

Select Password

Using the number buttons on your remote control, enter a four-digit password to use to exit Kids Zone.

FIG. 7

Kids Zone Enabled

700

Kids Zone is now enabled and can be entered from the Now Playing List. You can further customize which shows will or will not appear in Kids Zone by selecting "Add shows to Kids Zone" within Kids Zone, and by changing the Kids Zone option on individual Program screens.

If the TiVo DVR has been unused for four hours it will automatically return to Kids Zone. To exit Kids Zone you will need to enter the password you just set up.

Press SELECT to continue

FIG. 8
800

Now Playing List

*Kids Zone* 801

- Bob the Builder — Sat 4/14
- Thomas & Friends — Thu 4/12
- DragonTales (3) — Mon 4/9
- Caillou (2) — Sun 4/8
- CSI: New York — Sat 4/7
- Simpsons, The (2) — Wed 4/4
- South Park (2) — Wed 4/4

Kids Program 1001

Thomas & Friends 1001

"Responsibility" Fireworks display; rock slide; Gordon enjoys showing off. 1002

1007 1006
Sat 10/12 9:00 am 9 PBS
1005 Duration: 1:00
1003 Rated TV-Y
1004 Children 1008

Play 1009
Delete now 1010
Remove from Kids Zone 1011
Don't do anything 1012

FIG. 11

Kids Now Playing — 1101

1100

*Exit Kids Zone*

Bob the Builder    Sat   4/9

Thomas & Friends    Thu   4/14

DragonTales (3)    Mon   4/11

Caillou (2)    Fri   4/8

*Add shows to Kids Zone*   1102

FIG. 12
1200

Add Shows to Kids Zone

You can add shows to Kids Zone that currently appear in your Now Playing List, or you can browse shows recommended by family-friendly organizations.

Add Virtual Channels  1201

Add shows from the Now Playing List  1202

Search for children's programming  1203

Done adding shows to Kids Zone  1204

FIG. 13
1300

Virtual Channels

Virtual Channels provide auto-record subscriptions from your favorite organizations.

To find out more and subscribe to Virtual Channels, visit us at www <dot> tivo <dot> com <slash> virtualchannels Press SELECT to continue    1301

Virtual Channel
Mothers of Preschoolers

1600

Mothers of Preschoolers
This is a great organization and they care about your toddler's education and development. Visit them at www <dot> mops <dot> org ✓ Add this channel  1601

View upcoming  1602

Don't do anything  1603

Add Shows to Kids Zone
1800

You can add shows to Kids Zone that currently appear in your Now Playing List, or you can browse shows recommended by family-friendly organizations.

Add Virtual Channels 1801

Add shows from the Now Playing List 1802

Search for children's programming 1803

Done adding shows to Kids Zone 1804

FIG. 20 Shows in Now Playing
2000

Select shows to add to Kids Zone. For episodic shows, the entire series will become available in Kids Zone as well as future episodes.

2002 Done

CSI: Crime Scene Investigators

CSI: Las Vegas

CSI: New York

2001 Finding Nemo

Simpsons, The

Sopranos, The

FIG. 21

Shows Added

2100

The following shows have been added to Kids Zone:

Finding Nemo  2101

Press SELECT to continue

Kids Now Playing

*Exit Kids Zone*

| Mothers of Preschoolers (4) 2201 | Sun 4/10 |
|---|---|
| Bob the Builder | Sat 4/9 |
| Thomas & Friends | Thu 4/7 |
| Finding Nemo | Wed 4/6 |
| DragonTales (3) | Mon 4/4 |
| Caillou (2) | Fri 4/1 |

*Add shows to Kids Zone*

FIG. 23
2300

Upcoming Program

Rugrats

"Draw!" (2005) The rugrats visit a historic Old West town; The rugrats learn to draw horses. (CC, Stereo)

Thu 5/12 8:00 am 10 PBS
Duration: 0:30
Rated TV-Y
Children
Press INFO for details Record this episode 2301

Get a Season Pass 2302

View upcoming episodes 2303

Kids Zone: 2304 (Not allowed) 2306

Don't do anything 2305

2400

Upcoming Program

Rugrats

"Draw!" (2005) The rugrats visit a historic Old West town; The rugrats learn to draw horses. (CC, Stereo)

Thu 5/12 8:00 am 10 PBS
Duration: 0:30
Rated TV-Y
Children
Press INFO for details Record this episode Get a Season Pass View upcoming episodes   2401

( Allowed  > )

Kids Zone:

Don't do anything

2600

8:34 AM
KBWB
13

2601 Floating image

2602 This channel is not available in Kids Zone right now. Press Channel Up/Down to view other channels in Kids Zone, or press the TiVo button to return to Kids Now Playing

FIG. 27
2700

8:34 AM
KBWB
13

Floating image
2701

Recording in progress. Live TV is not available in Kids Zone right now. Press the TiVo button to return to Kids Now Playing where you can watch a recorded show.
2702

FIG. 28
2800
TiVo Central
Now Playing List
Watch Live TV
Pick Programs to Record
Music, Photos, Products, & More
Showcases & TV Guide®
Messages & Settings  2800
 The Apprentice: Go behind the scenes!
 Watch the King Kong Movie Trailer

2900

Messages & Settings

- Messages
- Settings
- Kids Zone Setup  2901
- Account & System Information
- Troubleshooting
- Restart or Reset System
- Standby

3100

SELECT the channels your children are permitted to watch when Kids Zone is on. To jump to a specific channel, use the number buttons. When finished, select "Done".

3400

DVD Content 3401

Thomas & Friends 3401

"Responsibility" Fireworks display; rock slide; Gordon enjoys showing off. 3402

3403 Duration: 1:00
3404 Rated TV-Y
3405 Children

3410

3406

Play
Allow in Kids Zone 3407
Hide from Kids Zone 3408
Don't do anything 3409

CUSTOMIZING DVR FUNCTIONALITY

CLAIM OF PRIORITY

This application claims priority as a continuation of U.S. patent application Ser. No. 12/950,898, filed Nov. 19, 2010, now U.S. Pat. No. 8,549,553, issued Oct. 1, 2013, which claims priority as a continuation application of U.S. patent application Ser. No. 11/713,242, filed Mar. 1, 2007, now U.S. Pat. No. 7,861,258, issued Dec. 28, 2010, which claims priority to U.S. Provisional Patent Application No. 60/778,596, filed Mar. 1, 2006, the entire contents of the aforementioned applications are hereby incorporated by reference as if fully set forth herein, under 35 U.S.C. §119(e). The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to digital video recorders ("DVRs").

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The introduction of the DVR to the consumer world has revolutionized the way viewers watch and record television programs. DVRs eliminate many of the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals (which may represent television programs and/or movies) as input from cables or satellite dishes, (or, in some cases, unlike VCRs, from broadband network connections) and also output television signals to a television set or other display.

A DVR's user can instruct the DVR to schedule, for recording, specified content that may be broadcasted or otherwise transmitted to the DVR at some future time. Thus, the user can schedule the automatic recording of the content in advance of the time that the DVR will receive the content. For example, the user can instruct the DVR to record unspecified content that will be broadcasted on a specified channel beginning at a specified date and time and ending at another specified time. For another example, the user can instruct the DVR to record a specified showing (on a specified channel, and beginning at a specified date and time) of a specified movie, specified event, or specified episode of a multi-episode television series. For another example, the user can instruct the DVR to record the next to-be-broadcasted instance of a specified movie, specified event, or specified episode of a multi-episode television series without specifying the date, time, or channel on which that instance will be broadcasted. For another example, the user can instruct the DVR to record all (or all first-run) episodes of a multi-episode television series on a specified channel without specifying the dates or times at which those episodes will be broadcasted. For another example, the user can instruct the DVR to record all (or all first-run) instances of movies, events, or episodes of a multi-episode television series that are associated with a specified keyword, a specified actor, and/or a specified director without specifying the titles, channels, or broadcasting times of those instances.

Many of the households in which DVRs are used also are those in which children are present. Parents who own DVRs might not want their children to watch certain televised content due to the violent or mature nature of that content, among other possible reasons. However, these parents might also want their DVRs to record such content for the parents alone to watch in privacy, despite the parents' desire to prevent their children from viewing such content. Thus, in some cases, a DVR might have, stored thereon, content that the parents wanted the DVR to record, but which the parents do not want their children to view.

Several schemes have been devised for preventing children from viewing selected televised content. One such scheme involves the "V-chip" technology. The V-chip allows parents to block certain kinds of television programming that the parents don't want their children to watch. Most television programs are now assigned a rating according to a system established by the broadcasting industry. The rating is encoded with the program so that, using the remote control, parents can program the V-chip to prevent a television from displaying programs that are associated with certain ratings.

In 1996, The U.S. Congress asked the broadcasting industry to establish a voluntary ratings system for TV programs. The industry did so by creating the ratings system known as "TV Parental Guidelines." This system was established by the National Association of Broadcasters, the National Cable Television Association, and the Motion Picture Association of America. Ratings established under this system appear in the corner of a television screen during the first 15 seconds of each program. The ratings are also included in many magazines and newspapers that provide TV listings. Ratings are given to all television programming except news, sports, and unedited movies on premium cable channels. Under this system, there are six possible ratings. TV-Y (All Children), found only in children's shows, means that the show is appropriate for all children. TV-7 (Directed to Older Children), found only in children's shows, means that the show is most appropriate for children age 7 and up. TV-G (General Audience) means that the show is suitable for all ages but is not necessarily a children's show. TV-PG (Parental Guidance Suggested) means that parental guidance is suggested and that the show may be unsuitable for younger children. This rating may also include a V for violence, an S for sexual situations, an L for language, and/or a D for suggestive dialogue. TV-14 (Parents Strongly Cautioned) means that the show may be unsuitable for children under 14. A V, S, L, or D may accompany a rating of TV-14. TV-MA (Mature Audience Only) means that the show is for mature audiences only and may be unsuitable for children under 17. A V, S, L, or D may accompany a rating of TV-MA.

Although V-chip technology allows parents to prevent certain kinds of televised content from being displayed to their children, many parents may find the V-chip technology to be over-inclusive. The V-chip technology that prevents children from watching certain televised content also may prevent parents from watching televised content that the parents want to view while not in the company of their children. Because the V-chip technology blocks all programming that does not satisfy parents' specified criteria, the V-chip technology could prevent DVRs from playing recorded content that parents might actually want to watch outside of their children's presence. Conceivably, parents could re-program a television's V-chip every time that the parents wanted to allow the television to present content that the children shouldn't view, but many parents might find repetitive re-programming to be a hassle. Additionally, such an approach carries the risk that the parents might forget to re-program the television's V-chip to prevent child-forbidden content from being presented, thereby accidentally exposing their children to content that the parents did not want their children to view. Furthermore, some televised content might not be associated with any rating; the manner in which the V-chip technology handles such content might vary from implementation to implementation.

Another scheme devised for preventing children from viewing selected televised content is the "parental controls" mechanism that is implemented within DVRs that are produced by TiVo Inc. The parental controls mechanism allows a parent to block out specified channels and certain kinds of televised content. In fact, the parental controls mechanism even allows a parent to place the DVR into a protected mode in which a parent-specified secret password must be supplied to the DVR before the DVR will permit the viewing of any channel. To set the DVR to the protected mode, a parent selects a "turn on parental controls" option within one of the DVR's menus. In response to the selection of this option, the DVR asks the parent to supply a four-digit password. From that point on, until the protected mode is exited, the DVR will prevent programs broadcasted on any parentally designated "blocked" channel from being displayed unless the password is supplied to the DVR. Parents can block channels of their choosing using a "channel lock" feature.

The parental controls mechanism also allows parents to block specified kinds of televised content based on the ratings that are associated with that content, regardless of the channels on which that content is broadcasted. When this feature is used, the DVR automatically determines the rating that is associated with televised content (using the ratings from the "TV Parental Guidelines" system discussed above, among potentially others), and then either blocks or allows that content based on whether that rating is permissible in view of parentally established settings. These settings may include "TV rating limits," which enable the blocking of televised content based on the "maturity level" of that content. Using TV rating limits, a parent specifies a certain level of restrictiveness from among several available levels. Televised content which has a rating that is not permissible in view of the specified level of restrictiveness is blocked. The settings also may include "movie rating limits," which allows a parent to specify which movie ratings (e.g., G, PG, PG-13, R, NC-17, and AO (adults only)) are permitted and which movie ratings are not permitted. Content which is associated with a movie rating that is not permissible in view of the parentally specified allowable set of movie ratings is blocked. The setting also may include "TV content" limitations, which allow a parent to specify categories (e.g., suggestive dialog, language, sexual content, violence, fantasy violence) of content that are forbidden. When this feature is used, televised content which is associated with any of the parentally selected categories is blocked, regardless of the general rating (e.g., TV-PG, TV-14, TV-MA) that is associated with that content.

As is discussed above, while in the protected mode provided by the "parental controls" mechanism, a TiVo DVR will not permit blocked content to be displayed unless the DVR's operator can supply the previously established password. Additionally, the protected mode provided by the "parental controls" mechanism may be exited indefinitely by selecting a certain menu option and supplying the password. In order to mitigate the problems that might arise when a parent forgets to place the DVR back into the protected mode after exiting the protected mode, the "parental controls" mechanism conveniently includes an "auto relock" feature which, when active, automatically places the DVR back into the protected mode whenever the DVR's controls have not been activated (e.g., via the remote control) for at least four hours.

Although the "parental controls" mechanism discussed above provides parents with a rich set of features for shielding their children from some undesirable content, the "parental controls" mechanism has some limitations. For example, although the "parental controls" mechanism has historically enabled the blockage of content based on channel or rating, the "parental controls" mechanism has not historically enabled the blockage of content based on various other factors that are unrelated to channel and rating. This concerns some parents, since the ratings associated with some content might be chosen by people with whose opinions and views the parents strongly disagree. Ratings are, to some extent, subjective. Some parents see existing ratings systems as being only coarsely defined, and as not being descriptive of some attributes of content about which a parent might wish to base his decision to block that content. For example, even though a television program might be broadcasted on a generally child-friendly television station (e.g., "PBS Kids Sprout"), and even though that television program might be associated with a child-friendly rating (e.g., TV-Y), that television program might promote some views to which some parents are adamantly opposed, and those views might not be discernable from any existing rating. A parent might want his child to be able to watch all of the television shows on "PBS Kids Sprout" except for "Postcards From Buster" and "Teletubbies." Unfortunately, besides blocking the entire "PBS Kids Sprout" channel using the "parental controls" mechanism, a parent might have no way of preventing his child from viewing these programs, since the ratings for all or nearly all of the programs on that channel are the same.

The "parental controls" mechanism is also somewhat limited in that it establishes only two distinct modes of DVR operation where content-blocking capability is concerned: protected or completely unprotected. Although these two modes might be appropriate for households in which the only individuals other than the parents are children of approximately the same age and maturity level, in other households, content restrictions universally imposed in the protected mode might be too restrictive for some older children but not restrictive enough for some younger children. Also, the parental controls mechanism in DVRs allow children to still display the names and descriptions of all of the programs in an Electronic Program Guide (EPG) as well as programs that the parents have recorded even though the children are not able to view the programs. Some implementations allow the blocking of "adult" titles, but are not able to block standard programming such as "Sex and the City" that have material that is mature in nature.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates an example of a DVR-presented main menu which contains a menu item whose selection initiates a process for establishing a kids zone on the DVR, according to an embodiment of the invention;

FIG. 4 illustrates an example of a DVR-presented screen that explains kids zone and requests confirmation prior to enabling kids zone, according to an embodiment of the invention;

FIG. 5 illustrates an example of a DVR-presented screen that provides a mechanism by which parents can configure a kid zone with pre-set default settings that are directed toward preventing content that is unsuitable for children of certain age groups, according to an embodiment of the invention;

FIG. 7 illustrates an example of a DVR-presented screen that explains that the DVR has been placed into a kids zone operational mode, according to an embodiment of the invention;

FIG. 8 illustrates an example of a DVR-presented screen that includes a menu item whose selection causes the DVR to enter the kids zone operational mode, according to an embodiment of the invention;

FIG. 10 illustrates an example of a DVR-presented screen that contains detailed information about a stored content item selected in the kids zone, according to an embodiment of the invention;

FIG. 11 illustrates another view of the "kids zone now playing" list screen of FIG. 9, according to an embodiment of the invention;

FIGS. 12 and 18 illustrate examples of a DVR-presented screen that contain menu items that represent various actions that can be taken to add user-selected content items to the kids zone, thereby making those user-selected content items "unrestricted" in the kids zone, according to an embodiment of the invention;

FIG. 13 illustrates an example of a DVR-presented screen that briefly introduces and explains virtual channels, according to an embodiment of the invention;

FIG. 20 illustrates the screen of FIG. 19 in which a check mark has been placed next to a user-selected content item that is to be added to the kids zone, according to an embodiment of the invention;

FIG. 21 illustrates an example of a DVR-presented screen that informs the user which of the selected content items have been added to the kids zone, according to an embodiment of the invention;

FIG. 22 illustrates an example of a DVR-presented screen that shows a folder that corresponds to a virtual channel, according to an embodiment of the invention;

FIGS. 23 and 24 illustrate an example of a DVR-presented screen that contains detailed information about an upcoming program, including whether or not presentation of the upcoming program is currently allowed in the kids zone, according to an embodiment of the invention;

FIG. 27 illustrates an example of a DVR-presented screen that informs a user that the viewing of live presentations is not currently available while the DVR is in the kids zone operational mode and is recording another show, according to an embodiment of the invention;

FIG. 28 illustrates an example of a DVR-presented screen that contains a main menu, including a "messages and settings" menu item whose selection causes the DVR to present a "messages and settings" menu, according to an embodiment of the invention;

DETAILED DESCRIPTION

Figure 1:
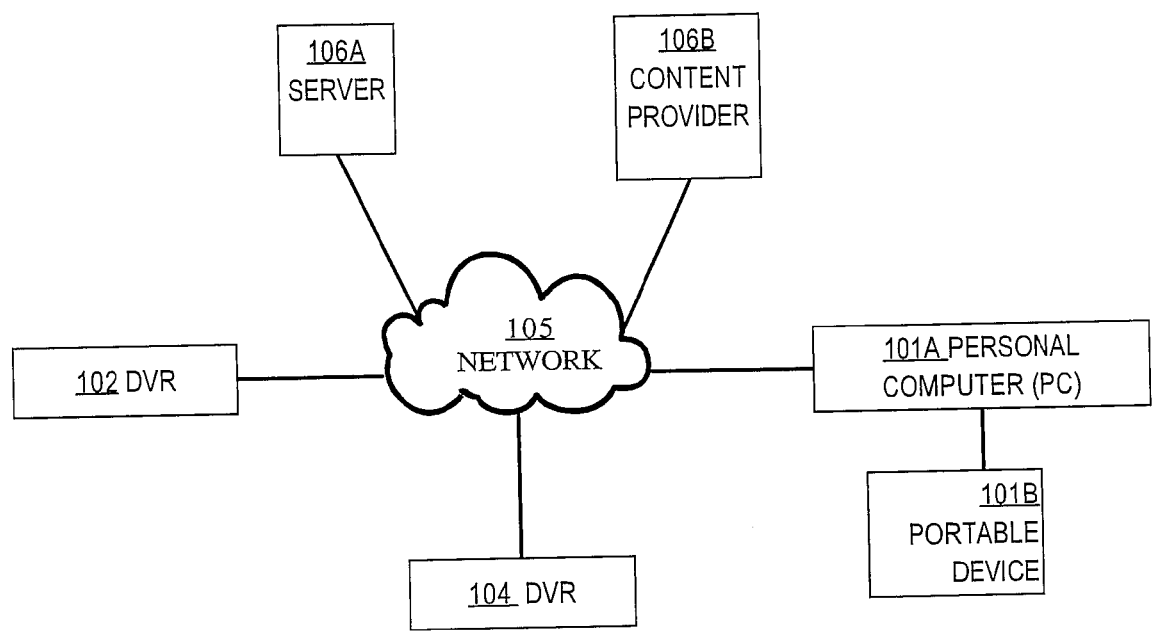
FIG. 1 illustrates an example system in which protected kids zones may be established on DVRs, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

Embodiments are described herein according to the following outline:

1.0 General Overview
2.0 System Structural Overview
3.0 Example Techniques and Processes
   3.1 Establishing and Entering a Kids Zone
   3.2 Designating Which Content Items Are Kids Zone-Accessible
   3.3 Restricting Live Presentations and Descriptive Information
   3.4 Handling Conflicting Scheduled Recordings
   3.5 Executable Content
   3.6 Automatic Standby Mode
   3.7 Requesting Parental Approval of Recording in Kids Zone
   3.8 Handling Failed Password Attempts
   3.9 Restricting Presentation Through Play Lists
   3.10 Restricting Presentation Through Timers
   3.11 Restricting Presentation of DVD Content
   3.12 Logging DVR Activity
   3.13 Restricting Advertisements
   3.14 Multiple Kids Zones on the Same DVR
4.0 Example DVR
5.0 Implementation Mechanisms—Hardware Overview 1.0 General Overview Systems and techniques described herein enable parents to establish one or more protected "kids zone" operational modes on a DVR. According to one such technique, a DVR receives, from a parent, "black list" identities (e.g., titles) of content items (e.g., television programs, movies, downloadable content, etc.) that the parent does not want children to view. The DVR stores associations between a particular kids zone and the identities. During times that the DVR is set to operate in the particular kids zone operational mode, the DVR prevents itself from presenting (e.g., playing or otherwise displaying) any content items that are associated with the identities. Additionally, during these times, the DVR prevents the scheduling of new (not already scheduled) recordings of any content items that are associated with the identities. However, during these times, the DVR still may obtain and store (e.g., by recording televised signals and/or downloading content) content items that are associated with the identities—as long as the recording of those content items was set up during a time in which the DVR was not operating in the particular kids zone operational mode. At other times, during which the DVR is not set to operate in the particular kids zone operational mode, the DVR may allow itself to present the content items that are associated with the identities, including content items that the DVR obtained and stored during times that the DVR was set to operate in the particular kids zone operational mode.

Parents may use this DVR feature to prevent their children from viewing specified content items while also causing the DVR to record those of the specified content items that the parents might want to view later. Additionally, parents may use this DVR feature to prevent their children from viewing specified content items without preventing their children from viewing other content items that are on the same channel as the specified content items, and without preventing their children from viewing other content items that have the same or even less restrictive ratings than those of the specified content items. Parents may impose finely tailored viewing restrictions that are not over-inclusive.

As is described below, in one embodiment of the invention, parents may select, from among potentially many different pre-set sets of restriction criteria that are appropriate for different age ranges, a specific "default" set of restriction criteria that will be active while the DVR is operating in the kids zone operational mode. Additionally, in one embodiment of the invention, parents may customize the selected restriction criteria to be even more or less restrictive than the criteria originally were.

Embodiments of the invention summarized above are described below in greater detail, along with some alternative embodiments of the invention. Although embodiments of the invention described below are described in the context of DVRs, in alternative embodiments of the invention, devices other than DVRs may be substituted for, and may perform similar operations to those that are performed by, DVRs.

2.0 System Structural Overview

FIG. 1 illustrates an example system in which protected kids (children's) zones may be established on DVRs, according to an embodiment of the invention. The system contains DVRs 102 and 104, each of which are communicatively coupled to network 105 through any communication interface, such as an Ethernet interface or wireless communications port. The system also includes server 106A, content provider 106B, personal computer 101A and portable device 101B.

Personal computer 101A may be a personal computing device, such as a desktop computer or laptop computer, and is also coupled to network 105 through any proper interface. Personal computer 101A is also connected to portable device 101B. Portable device 101B is a handheld computing device, cellular phone, portable media player, or any other portable device capable of displaying multimedia content. DVRs 102 and 104, personal computer 101A, and portable device 101B each communicate with server 106A and content provider 106B through network 105.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In one embodiment of the invention, DVRs 102 and 104 communicate with server 106A, which provides program guide data, graphical resources (such as fonts, pictures, etc.), service information, software, advertisements, event identification data, and other forms of data that enable DVRs 102 and 104 to operate independently of server 106A to satisfy viewer interests.

Content provider 106B may also provide multimedia program content directly to DVRs 102 and 104 through: over the air broadcasts, satellite transmissions, coaxial cable, and/or broadband networks (such as the Internet or intranets). The multimedia program content includes such content as: feature length movies, sitcoms, variety shows, talk shows, advertisements, etc., for display to DVR users. Content provider 106B also may provide, to server 106A, additional data, including promotional data, icons, web data, and other information for server 106A to interpret and provide to DVRs 102 and 104. According to one embodiment of the invention, content provider 106B provides multimedia program content to server 106A for processing. Server 106A processes the multimedia program content, creates the event identification data, and provides the event identification data to DVRs and other devices.

In one embodiment of the invention, protected kids zones may be established on each of DVRs 102 and 104. The kids zones established on each DVR may differ from each other. For example, due to differing parental configurations of DVRs 102 and 104, the content which DVR 102 blocks when DVR 102 is operating in a kids zone operational mode may differ from the content which DVR 104 blocks when DVR 104 is operating in a kids zone operational mode. Kids zones are discussed in greater detail below.

3.0 Example Techniques and Processes 3.1 Establishing and Entering a Kids Zone

According to one embodiment of the invention, at one point or another, a DVR (e.g., DVR 102) displays a main menu such as is illustrated in FIG. 2. The DVR may cause such a menu (and other menus, screens, dialogs, and user interfaces described herein) to be displayed by sending signals to a television set, monitor, or other visual display device. A parent (or other user) can use a remote control (which is configured to operate with the DVR) to select, from among the several menu items, a particular menu item in which the parent is interested. As shown in FIG. 2, among the other user-selectable options shown in the main menu 200 is a particular menu item whose selection causes the DVR to initiate a process for establishing a kids zone for that DVR. Note that the parent/child relationship is translatable to "grandparent/child", "guardian/ward", "employer/employee", "teacher/student", "doctor/patient", etc., where there is an entity set that wants to control content displayed to another entity set. In FIG. 2, this particular menu item is labeled, "Got Kids? Set up Kids Zone!" 201.

Figure 3:
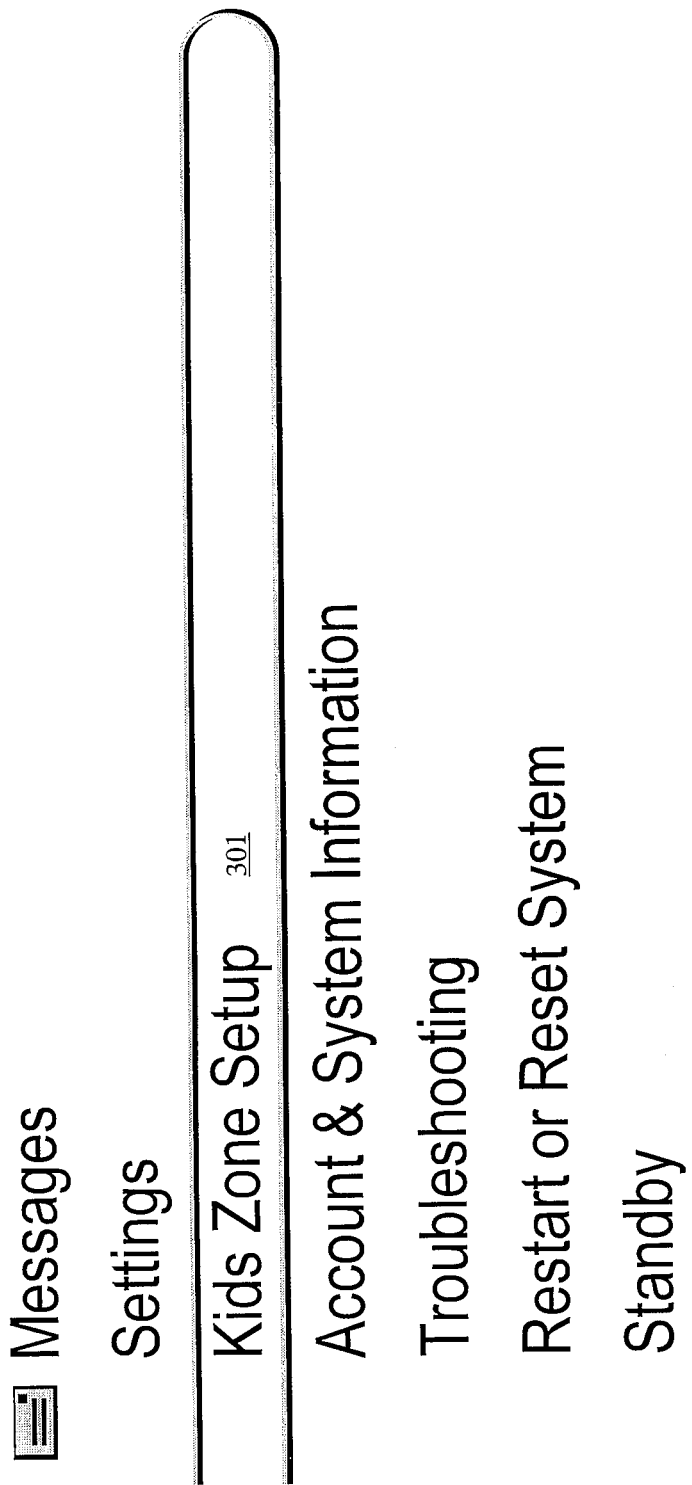
FIG. 3 illustrates an example of a "messages and settings" menu that a DVR displays when a "messages and settings" menu item is selected, according to an embodiment of the invention.

In one embodiment of the invention, the process for establishing a kids zone for a DVR may be established via several different menu items to which a parent may navigate from any of a variety of different DVR-presented menus. FIG. 3 illustrates an example of a "messages and settings" menu 300 that a DVR displays when a "messages and settings" menu item 202 (shown in FIG. 2) is selected, according to an embodiment of the invention. According to one embodiment of the invention, this menu includes a menu item labeled "Kids Zone Setup" 301. User selection of this menu item also causes the DVR to initiate the process for establishing a kids zone for that DVR if no kids zone has been established on that DVR yet, or to present options for modifying a kids zone if at least one kids zone has been established on the DVR.

FIG. 4 illustrates an example of a DVR-presented screen 400 that explains kids zone and requests confirmation prior to enabling kids zone, according to an embodiment of the invention. For example, DVR 102 may cause the screen shown in FIG. 4 to be presented to a parent in response to that parent's selection of the "Set up Kids Zone" menu item 201 in the main menu of FIG. 2, or in response to that parent's selection of the "Kids Zone Setup" menu item 301 in the "messages and settings" menu of FIG. 3. The screen shown in FIG. 4 informs the parent that, during times in which DVR 102 is operating in the kids zone operational mode (in contrast to the DVR's general default operational mode), users of DVR 102 (more specifically, children) will not be able to view content that does not satisfy criteria of the parents' choosing. The screen additionally informs the parent that, during these times, users of DVR 102 will be prevented from (a) viewing certain already-recorded instances of content items and (b) causing DVR 102 to record any content items that have not already been scheduled for recording.

In one embodiment of the invention, user selection of the menu option labeled "Yes, enable Kids Zone" 401 causes DVR 102 to present the screen shown in FIG. 5. Alternatively, user selection of the menu option labeled "No, thank you" 402 causes DVR 102 to terminate the process for establishing the kids zone on DVR 102.

FIG. 5 illustrates an example of a DVR-presented screen 500 that provides a mechanism by which parents can configure a kid zone with pre-set default settings that are directed toward preventing content that is unsuitable for children of certain age groups, according to an embodiment of the invention. The screen comprises a menu that includes menu items that represent different age ranges. In the example shown, there is a first menu item for "ages under 4 years" 501, a second menu item for "ages 4 to 7 years" 502, and a third menu item for "ages 7 to 12 years" 503. In one embodiment of the invention, the menu can be customized to contain additional, fewer, or different age ranges, or different viewer categories completely (which might or might not be based on age). For example, age ranges can be "ages 6 and under," "ages 9 and under," "ages 12 and under," etc.

In one embodiment of the invention, each age range is associated with a separate set of restriction criteria. The restriction criteria that are associated with one age range may differ from the restriction criteria that are associated with another age range. For example, the restriction criteria that are associated with the "under 4 years" age range may be more restrictive than the restriction criteria that are associated with the "ages 4 to 7 years" age range. Similarly, the restriction criteria that are associated with the "ages 4 to 7 years" age range may be more restrictive than the restriction criteria that are associated with the "ages 7 to 12 years" age range. Although age ranges are presented as selectable menu items in one embodiment of the invention, in alternative embodiments of the invention, viewer categories other than age ranges are presented as selected menu items. Each viewer category may be mapped to a separate, possibly different, set of restriction criteria.

Among other criteria, restriction criteria may indicate (a) specified channels that are to be blocked when a DVR is operating in an associated kids zone mode, (b) specified Uniform Resource Locators ("URLs") and/or portions thereof (e.g., Internet domains) from which content is not to be presented when the DVR is operating in the associated kids zone mode, (c) specified ratings and categories of content that are to be blocked when the DVR is operating in the associated kids zone mode, and/or (d) specified titles of content that is to be blocked when the DVR is operating in the associated kids zone mode. Additionally, in one embodiment of the invention, restriction criteria also may include "white list" criteria that indicate, for example, specified titles of content that should not be blocked, regardless of other restriction criteria, when the DVR is operating in the associated kids zone mode. In one embodiment of the invention, during times in which a DVR is operating in a kids zone mode that is associated with restriction criteria that include white list criteria, the DVR allows the viewing and recording of content that is associated with titles that are specified in the white list criteria even if the DVR otherwise would block the viewing and recording of that content due to that content's failure to satisfy the other restriction criteria.

In one embodiment of the invention, the restriction criteria that are associated with each age are specified by one or more people other than the owners and post-purchase operators of the DVR. For example, DVR 102 may come shipped with, or may automatically download, for each age range, default restriction criteria that are proposed by the providers of DVR 102 and/or other entities that (a) do not own DVR 102 and (b) do not operate DVR 102 after the purchase of DVR 102 by the owners of DVR 102.

Figure 6:
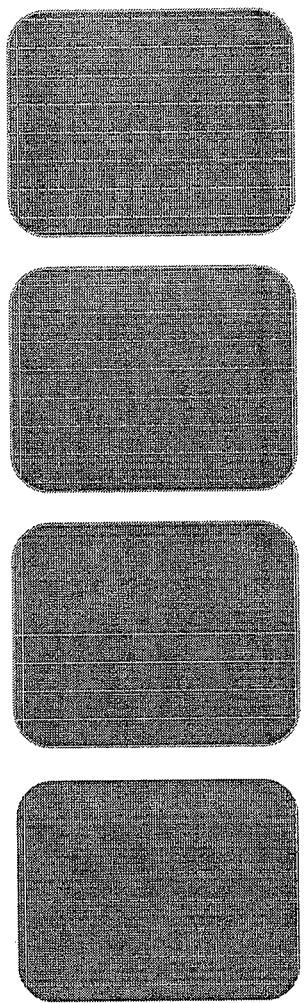
FIG. 6 illustrates an example of a DVR-presented screen that provides a mechanism by which a parent can supply a password, according to an embodiment of the invention.

In one embodiment of the invention, after a parent has selected an age range for the kids zone, as described above with reference to FIG. 5, DVR 102 requests a new password from the parent. FIG. 6 illustrates an example of a DVR-presented screen 600 that provides a mechanism by which a parent can supply a password, according to an embodiment of the invention. In the example illustrated, the parent uses the DVR remote control to enter a four-digit password. Any time that the DVR has been placed in the kids zone operational mode, the parent will be required to supply the entered password at any time that the parent wishes the place the DVR into an operational mode other than the kids zone. The secrecy of the password prevents children from exiting the kids zone and from changing the settings thereof.

Although the example illustrated is described with reference to a four-digit password, other embodiments of the invention may ask for and use, instead, passwords of other lengths and compositions. For example, the password might be any number of digits and/or alphanumeric characters. For another example, the password might be formed by the pressing of parent-selected buttons on the DVR remote control in a parent-selected sequence.

In one embodiment of the invention, after the parent has supplied, to DVR 102, the age range and the password for the kids zone, the kids zone is established. DVR 102 maps the restriction criteria to the kids zone and stores the mapping. However, at this point, DVR 102 has not necessarily been placed into the kids zone operational mode. FIG. 7 illustrates an example of a DVR-presented screen 700 that explains that the kids zone has been established, according to an embodiment of the invention. The illustrated screen explains that the kids zone has been established, and instructs the parent on how to place the DVR into the newly established kids zone operational mode. The illustrated screen informs the parent that the DVR can be placed into the kids zone operational mode via selection of a particular menu item in the "now playing" list (which is accessible via selection of a certain menu item on the main menu described above with reference to FIG. 2). The illustrated screen also informs the parent that the kids zone settings (such as which content DVR 102 can present while the DVR is in the kids zone operational mode) can be modified by following a specified procedure.

Additionally, in one embodiment of the invention, the screen 700 explains that the DVR will automatically place itself back into the kids zone operational mode after a specified period of time (in this example, four hours) has passed during which the DVR's controls have not been used (either via the DVR remote or the DVR's on-surface console). In one embodiment of the invention, this "auto-relock" feature may be disabled by following a specified process.

In one embodiment of the invention, after the kids zone has been established and created on DVR 102 as described above, a menu item, whose selection causes DVR 102 to place itself into the kids zone operational mode, appears in the DVR's general "now playing" list. FIG. 8 illustrates an example of a DVR-presented screen that includes a menu item whose selection causes the DVR to enter the kids zone operational mode, according to an embodiment of the invention. The screen illustrated in FIG. 8 shows the titles of content (e.g., television programs) that DVR 102 has obtained and stored (e.g., by recording the content as the content was broadcast, or by downloading the content over a network) for later presentation. Above these titles, the illustrated screen 800 shows a "kids zone" menu item 801. A user's selection of this menu item causes DVR 102 to place itself into the kids zone operational mode. Once DVR 102 has been placed into the kids zone operational mode, the content that DVR 102 can present, potentially including some of the content that DVR 102 has already obtained and stored, may become unavailable for presentation until DVR 102 has been placed back into the general, unrestricted operational mode, or unless the previously established password is supplied to override, temporarily, the restrictions imposed in the kids zone.

Figure 9:
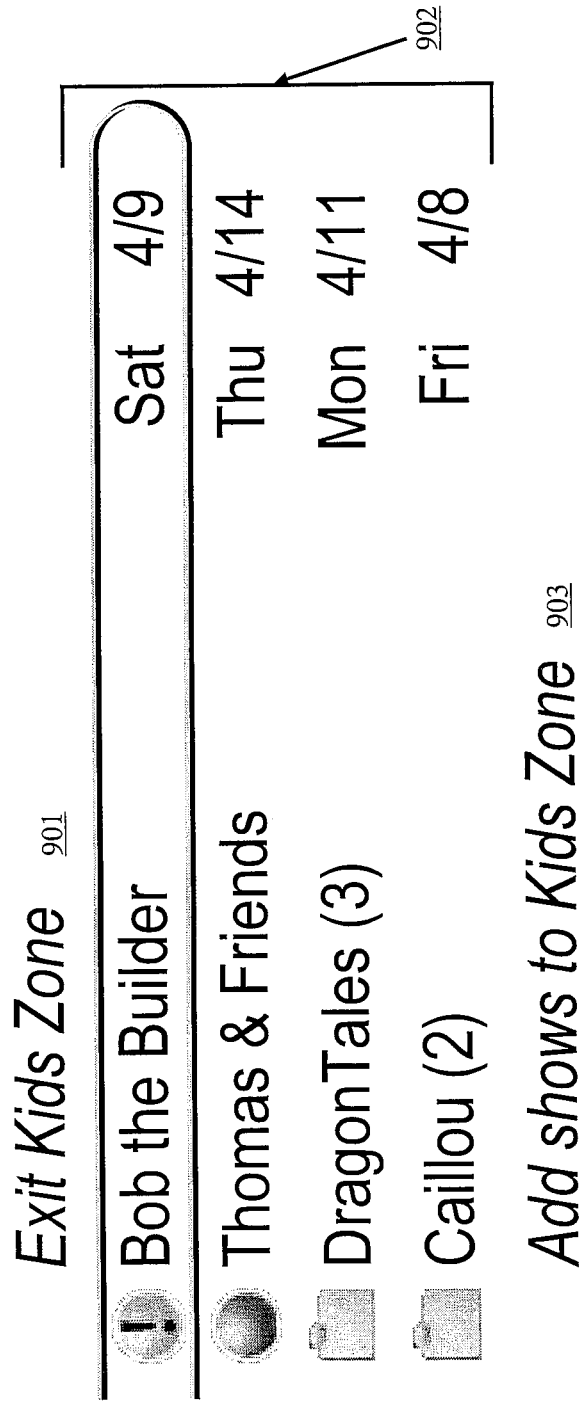
FIG. 9 illustrates an example of a DVR-presented screen that shows only content items that are allowed by the restriction criteria that are associated with the kids zone, according to an embodiment of the invention.

FIG. 9 illustrates an example of a DVR-presented screen 900 that shows only content items that are allowed by the restriction criteria that are associated with the kids zone 902, according to an embodiment of the invention. In contrast to the general "now playing" list of FIG. 8, the "kids zone now playing" list 900 of FIG. 9 omits, from the list, all of the content items whose attributes and characteristics (e.g., title, rating, category, channel or URL from which obtained, etc.) fail to satisfy the restriction criteria that are associated with the kids zone. For example, although content items such as "Bob the Builder," "Thomas & Friends," "DragonTales," and "Caillou" remain in the "kids zone now playing" list of FIG. 9, other content items such as "CSI: New York," "The Simpsons," and "South Park," which appeared in the general "now playing" list of FIG. 8, are not shown in the "kids zone now playing" list. The latter content items are omitted from the "kids now playing" list because, for whatever reason, they do not satisfy the restriction criteria that are associated with the kids zone. These latter content items are still stored on DVR 102, but, in one embodiment of the invention, they are not accessible from DVR 102 while DVR 102 is in the kids zone operational mode.

The example screen shown in FIG. 9 also includes an "exit kids zone" menu item 901 and an "add shows to kids zone" menu item. In one embodiment of the invention, user selection of the "exit kids zone" menu item 901 causes DVR 102 to prompt the DVR's user for the previously established password. Submission of the correct password in response to the prompt causes DVR 102 to exit the kids zone and place itself into the general, unrestricted operational mode, at least temporarily. Similarly, in one embodiment of the invention, user selection of the "add shows to kids zone" menu item 903 also causes DVR 102 to prompt the DVR's user for the previously established password. Submission of the correct password in response to the prompt causes DVR 102 to initiate a process through which the DVR's user can modify the restriction criteria that are associated with the kids zone. In any case, submission of an incorrect password in response to a prompt does not allow exit from or alteration of the kids zone.

In one embodiment of the invention, user selection of a content item's title shown in the "kids zone now playing" list causes DVR 102 to display more detailed information about that content item. FIG. 10 illustrates an example of a DVR-presented screen 1000 that contains detailed information about a stored content item selected in the kids zone, according to an embodiment of the invention. In the example shown, the selected content item is a specific episode of the "Thomas & Friends" series 1001. The specific episode's title 1002, as displayed on the screen, is "Responsibility." The screen describes some of the notable event that are depicted in the episode—this enables potential viewers, especially parents, to know about the substance of the selected content item before allowing the DVR to actually present the content item. The screen also shows the content item's rating 1003 (in this case, "TV-Y"), a brief explanation of the content item's genre/category established by the guide data provider 1004 (in this case, "Children"), the content item's duration 1005, the channel from which the content item was obtained 1006

(in this case, "9 PBS"), the date and time at which the DVR began to obtain the content item 1007, and a "KZ" icon 1008 that indicates that this is a content item that the DVR is allowed to present this content item while the DVR is in the kids zone operational mode.

In one embodiment of the invention, the "KZ" icon 1008 is shown on "program information" screens such as this one for all programs whose attributes and characteristics pass the kids zone's restriction criteria—even if DVR 102 is not currently in the kids zone operational mode; this allows parents to determine, from any operational mode, whether a particular content item will be accessible from the kids zone. A parent might discover, from the "KZ" icon, that a particular content item which the parent did not suspect to be accessible from within the kids zone actually is accessible from (i.e., can be presented from and can be scheduled for recording from) within the kids zone. In response, a parent might take action to prevent the particular content item from being accessible within the kids zone in the future, as is discussed below.

The screen illustrated in FIG. 10 also contains menu items that represent actions that may be taken relative to the selected content item. In the example shown, the menu items include items such as "play" 1009, "delete now" 1010, "remove from kids zone" 1011, and "don't do anything" 1012. In one embodiment of the invention, user selection of the "play" menu item 1009 causes DVR 102 to present the selected content item (i.e., by reading data that represents the content item from the DVR's persistent storage device and sending signals that represent the content item to a display device such as a television). In one embodiment of the invention, user selection of the "delete now" menu item 1010 causes DVR 102 to remove the selected content item from all of the DVR's "now playing" lists (even though the selected content item might actually remain, at least temporarily, on the DVR's persistent storage device in a recently deleted folder and is recoverable by the parent). In one embodiment of the invention, user selection of the "don't do anything" menu item 1012 causes DVR 102 to display, once again, the "kids zone now playing" list of FIG. 9.

In one embodiment of the invention, user selection of the "remove from kids zone" 1011 causes DVR 102 to alter the restriction criteria that are associated with the kids zone so that the selected content item becomes added to the black list of content items that DVR 102 is prevented from presenting while in the kids zone operational mode. In one embodiment of the invention, content items may be added to the black list from within the kids zone without supplying the previously established password, but in an alternative embodiment of the invention, selection of the "remove from kids zone" menu item 1011 causes DVR 102 to prompt the user for the previously established password. In such an alternative embodiment of the invention, DVR 102 does not add the selected content item to the black list unless the DVR's user supplies the correct password in response to the prompt; this prevents children from making the kids zone unnecessarily restrictive against their parents wishes. In one embodiment of the invention, addition of the selected content item to the black list causes DVR 102 to display, once again, the "kids zone now playing" list of FIG. 9. However, the "kids zone now playing list" will no longer include the selected content item, because, as a result of the addition of the selected content item to the black list, the selected content item will no longer satisfy the restriction criteria that are associated with the kids zone.

In one embodiment of the invention, at times during which DVR 102 is in the kids zone operational mode, DVR 102 prevents the presentation of content items whose attributes and characteristics do not satisfy the kids zone's restriction criteria, regardless of whether those content items are being broadcasted currently or were previously obtained and stored on a persistent storage device of DVR 102. In one embodiment of the invention, at times during which DVR 102 is in the kids zone operational mode, DVR 102 prevents the scheduling of the recording of content items whose attributes and characteristics do not satisfy the kids zone's restriction criteria. In one embodiment of the invention, content items that are not associated with any rating are automatically treated as though they were associated with the most restrictive rating possible for purposes of determining whether those content items satisfy the kids zone's restriction criteria. A parent may specifically allow a content item in the white list that is not associated with any rating. In one embodiment of the invention, content items that are not associated with any rating are automatically associated with special rating that allows a parent to allow or not allow content items that are not rated. In one embodiment of the invention, a parent may turn on or off the ability record programs or schedule recordings of programs while in the kids mode. If the recording ability is turned on, then any recordings set in kids mode are not be able to cancel or preempt a recording set outside of the kids mode.

However, in one embodiment of the invention, during these times, DVR 102 may still allow certain restriction criteria-failing content items to be recorded or otherwise obtained if (and only if) the recording of those content items was scheduled while DVR 102 was not in the kids zone operational mode. While DVR 102 is in the kids zone operational mode and is obtaining (e.g., recording or downloading) such a restriction criteria-failing content item, DVR 102 prevents the actual presentation of that content item. Therefore, in such an embodiment of the invention, DVR 102 prevents the presentation of restriction criteria-failing content items while DVR 102 is obtaining those content items during times that DVR 102 is in the kids zone operational mode.

Figure 29:
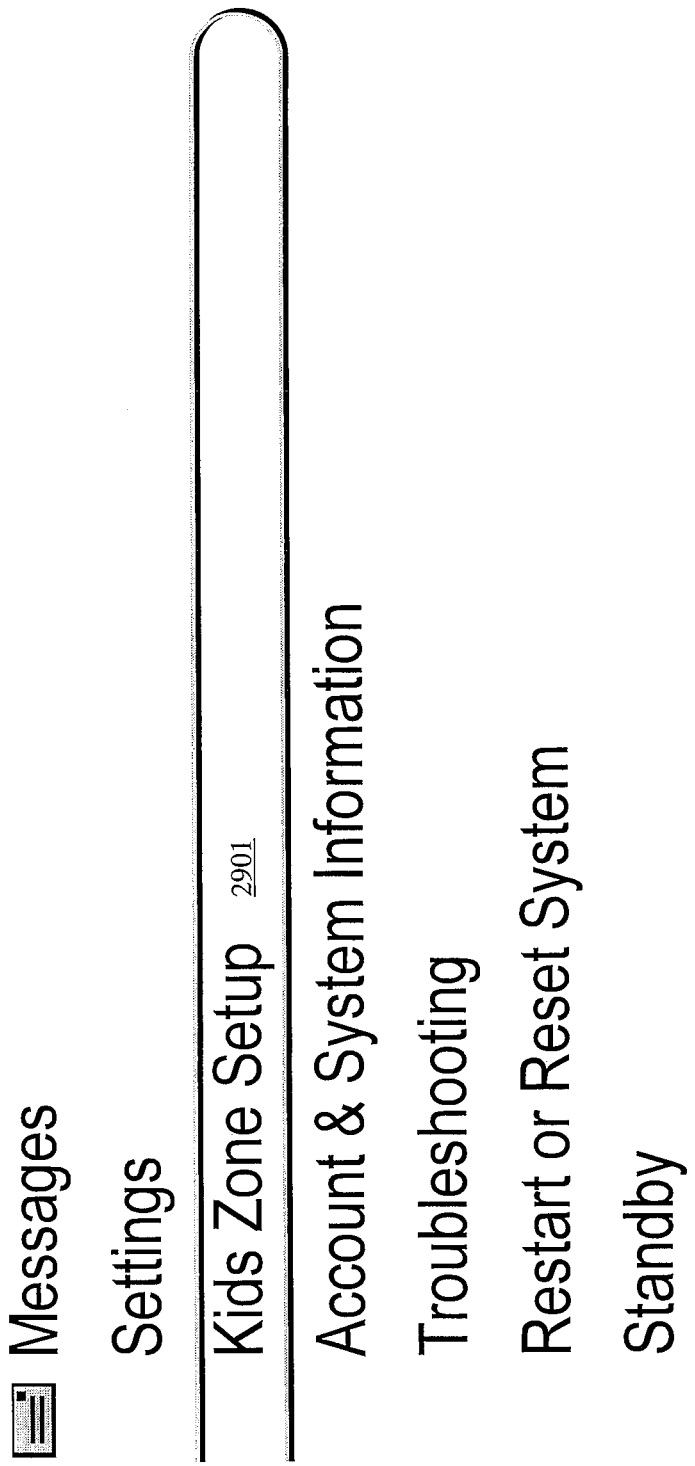
FIG. 29 illustrates an example of a DVR-presented screen that contains a "messages and settings" menu, including a "kids zone setup" menu item whose selection causes the DVR to initiate a process through which the DVR user can modify kids zone settings, according to an embodiment of the invention.
Figure 30:
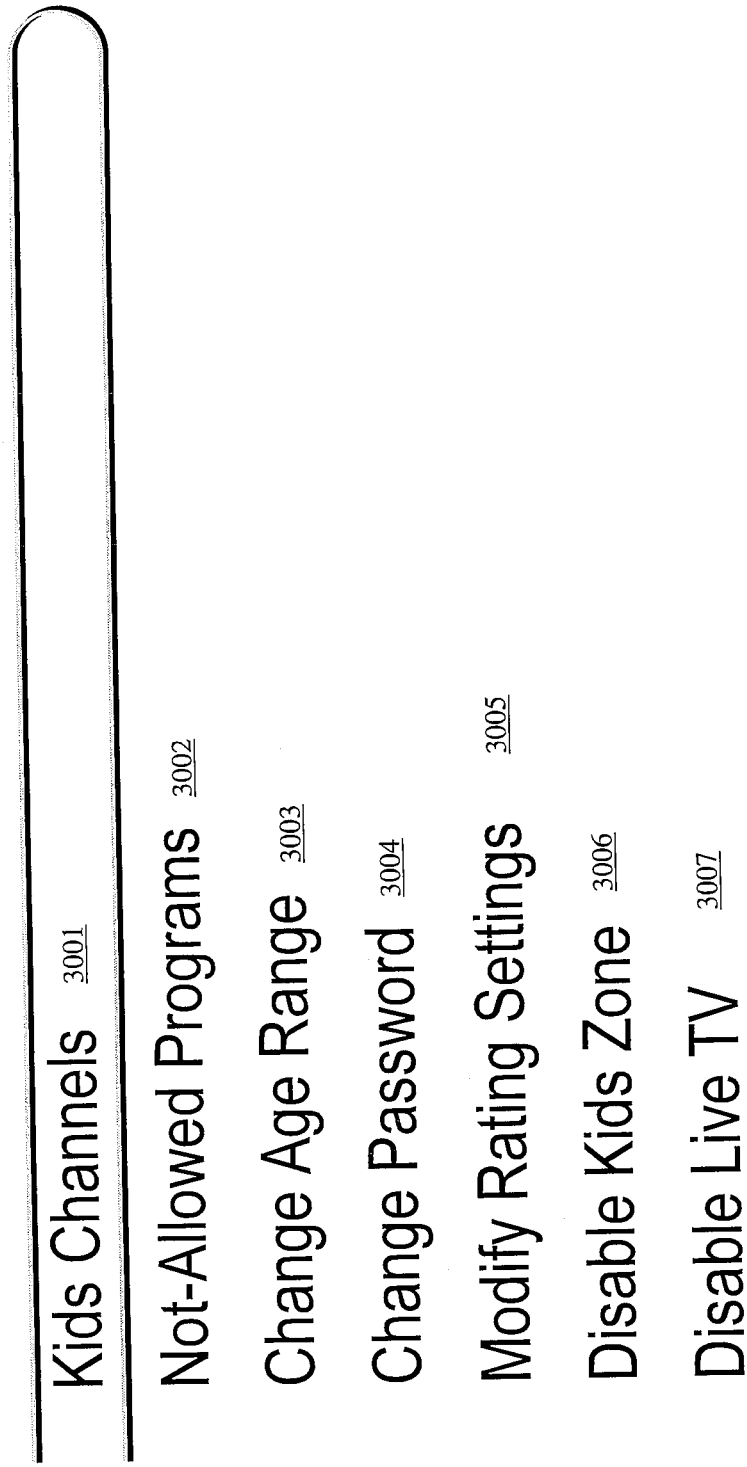
FIG. 30 illustrates an example of a DVR-presented screen which contains menu items whose selection causes the DVR to initiate processes through which DVR users can modify the kids zone settings, according to an embodiment of the invention.

FIGS. 28 and 29 illustrate an example of a DVR-presented screen 2800 which contains a menu item "Messages and Settings" 2801 whose selection causes the DVR to display a "Messages and Settings" screen 2900 that allows a user to select a menu item "Kids Zone Setup" 2901. FIG. 30 illustrates an example of a DVR-presented screen 3000 which contains menu items whose selection causes the DVR to initiate processes through which DVR users can modify the kids zone settings, according to an embodiment of the invention. As shown, the menu items include "kids channels" 3001, "not-allowed programs" 3002, "change age range" 3003, "change password" 3004, "modify rating settings" 3005, "disable kids zone" 3006, and "disable live TV" 3007. In one embodiment of the invention, user selection of the "change age range" menu item 3003 causes DVR 102 to present, to the DVR user, the age range selection screen described above with reference to FIG. 5. Through the age range selection mechanism, the DVR user can choose a different age range to be associated with the kids zone. In response to the DVR user's selection of a different age range, DVR 102 maps, to the kids zone, the "default" restriction criteria that are associated with the selected age range, which may be different than the restriction criteria which were previously mapped to the kids zone. In one embodiment of the invention, user selection of the "not-allowed programs" menu item causes DVR 102 to present, to the DVR user, an interface through which the DVR user can choose or otherwise specify content items that are to be added to the black list of the kids zone's restriction criteria, thereby causing DVR 102 to block the presentation of those content items during times that DVR 102 is in the kids zone operational mode.

Figure 31:
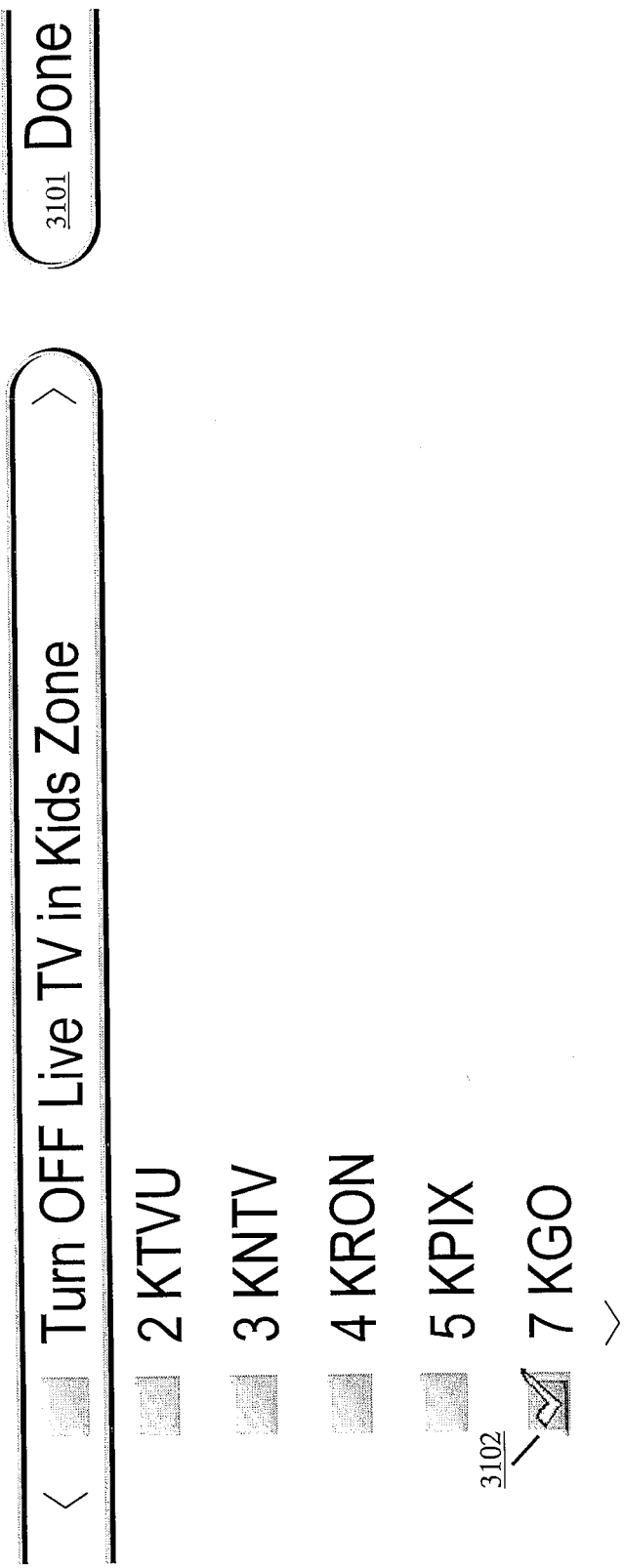
FIG. 31 illustrates an example of a DVR-presented screen that lists channels and acts as an interface through which a DVR user can choose which channels are allowable in the kids zone, according to an embodiment of the invention.

In one embodiment of the invention, user selection of the "kids channels" menu item 3001 causes DVR 102 to present, to the DVR user, a screen such as is shown in FIG. 31. FIG. 31 illustrates an example of a DVR-presented screen 3100 that lists channels and acts as an interface through which a DVR user can choose which channels are allowable in the kids zone, according to an embodiment of the invention. In one embodiment of the invention, in response to a user's selection of a particular channel in the list, DVR 102 places a check mark in the checkbox that is displayed next to that channel's identity 3102. In one embodiment of the invention, in response to a user's selection of the "done" menu item 3101, DVR 102 adds, to the list of the kids zone's restriction criteria, the identities of all of the channels whose checkboxes contain a check mark, thereby allowing those channels to be surfed while in kids zone operational mode. In one embodiment of the invention, during times that DVR 102 is in the kids zone operational mode, DVR 102 permits the presentation of content items that are served by channels whose identities are in the white list and have ratings that are appropriate for the age level selected.

In one embodiment of the invention, the selection of the "modify rating settings" menu item 3005 allows the setting of content item ratings that are allowed in the kids zone operational mode. In one embodiment of the invention, the selection of the and "disable live TV" menu item 3007 causes the DVR 102 to not allow viewing of live TV while in the kids zone operational mode.

3.2 Designating which Content Items are Kids Zone-Accessible

In one embodiment of the invention, the kids zone may be made a little less restrictive, even from within the kids zone, by altering the restriction criteria that are associated with the kids zone so that the restriction criteria's white list includes one or more specified content items that previously were not contained therein. In this manner, a parent may customize the kids zone's settings and restriction criteria to differ, at least slightly, from the "default" settings and restriction criteria that were associated with the kids zone when the parent selected the age range or other viewer category as described above with reference to FIG. 5.

FIG. 11 illustrates another view of the "kids zone now playing" list screen of FIG. 9, according to an embodiment of the invention. Notably, in one embodiment of the invention, the "kids zone now playing" list screen 1100 includes a prominent caption at the top of the screen 1101 that enables a viewer to recognize that this list is the "kids now playing" list as opposed to the less restricted general "now playing" list of FIG. 8. In one embodiment, the background color of screen 1100 is set to a color that a child can easily recognize that the DVR is in kids mode in case the child is not able to read. In the screen shown, the "add shows to kids zone" menu item 1102 has been highlighted in response to a DVR user's activation of selection controls on the DVR's remote control. In one embodiment of the invention, user selection of this menu item causes DVR 102 to initiate a process by which the DVR's user (usually a parent) may add user-selected content items to the white list of the kids zone's restriction criteria. As is discussed above, in one embodiment of the invention, restriction criteria that are associated with the kids zone cannot be modified unless the DVR's user supplies the correct password when prompted to do so.

In one embodiment of the invention, user selection of the "add shows to kids zone" menu item shown in FIG. 11 causes DVR 102 to present the screen illustrated in FIG. 12. FIG. 12 illustrates an example of a DVR-presented screen 1200 that contains menu items that represent various actions that can be taken to add user-selected content items to the kids zone, thereby making those user-selected content items "unrestricted" in the kids zone, according to an embodiment of the invention. The menu items shown in the example of FIG. 12 include an "add virtual channels" menu item 1201, an "add shows from the now playing list" menu item 1202, a "search for children's programming" menu item 1203, and a "done adding shows to kids zone" menu item 1204. In one embodiment of the invention, user selection of the "done adding shows to kids zone" menu item 1204 causes DVR 102 to present, again, the screen that DVR 102 was presenting prior to presenting the screen illustrated in FIG. 12.

Different ways for a parent to add content items to the white list of the kids zone's restriction criteria (thereby allowing DVR 102 to present those content items during times that DVR 102 is in the kids zone operational mode) are discussed below.

3.2.1 Adding Content Items from Virtual Channels/Guru Guides

Parents of children might find the opinions and recommendations of others helpful when deciding which content items, channels, and other entities will be accessible from within the kids zone. In one embodiment of the invention, a parent may view and select an entire list of recommended suggestions that has been provided by an interested party, such as a parent-oriented organization. In one embodiment of the invention, each recommended suggestion comprises a set of criteria. The set of criteria may specifically identify one or more content items, channels, URLs, etc. Additionally or alternatively, the set of criteria may comprise criteria that some content items, channels, URLs, etc., might or might not satisfy. The content items, channels, URLs, etc., that satisfy a recommended suggestion's criteria are described herein as being "identified by" that recommended suggestion, even though the recommended suggestion might not expressly identify those content items, channels, URLs, etc., by name, title, or other specific identifier. In one embodiment of the invention, rather than selecting an entire list of recommended suggestions that have been provided by an interested party, a parent may select a mere subset of the entire list—only the recommended suggestions with which the parent agrees, for example. A parent might select from among recommended suggestion lists that have been provided by several different interested parties.

In one embodiment of the invention, content items and other entities that satisfy the criteria of a parentally selected recommended suggestion are automatically added to the kids zone (e.g., by placing such content items or entities in the white list of the kids zone's restriction criteria). Because the parties that supply the recommended suggestions purport to have some expertise regarding the classification of content that children should or should not be watching, parties that provide recommended suggestions are also called "gurus," and the lists of recommended suggestions that these gurus provide are also called "guru guides." The parties can also be considered as trusted parties.

In one embodiment of the invention, DVR-obtained content items that satisfy a list of recommended suggestions' criteria are all placed into a "folder" that is associated with that list. Such a folder contains only content items that satisfy the folder's corresponding recommended suggestion lists' criteria. In one embodiment of the invention, some folders that correspond to recommended suggestion lists appear in the "kids zone now playing" list. User selection of such a folder causes DVR 102 to present, to the DVR user, a list of the content items that are contained within that folder. From one perspective, such a folder may be viewed as a sort of "virtual channel" in the same way that all of the content items that are broadcast on a particular television channel might be placed automatically within a folder that corresponds specifically to that channel, all of the content items that satisfy a recommended suggestion lists' criteria might be placed automatically within a folder that corresponds specifically to that recommended suggestion list. Thus, folders that correspond specifically to recommended suggestion lists, or user-selected sub-portions of those lists, are also called "virtual channels." Virtual channels and guru guides are described in greater detail in U.S. patent application Ser. No. 11/649,444, entitled "RECOMMENDED RECORDING AND DOWNLOADING GUIDES", owned by the Applicant and incorporated by reference herein in its entirety. In one embodiment of the invention, the programs appear in folders when kids mode is not active and, when kids mode is active, the programs are shown in the "kids zone now playing" list and not in folders because some age ranges may not understand the concept of a folder or, alternatively, series of programs may appear in folders.

Figure 17:
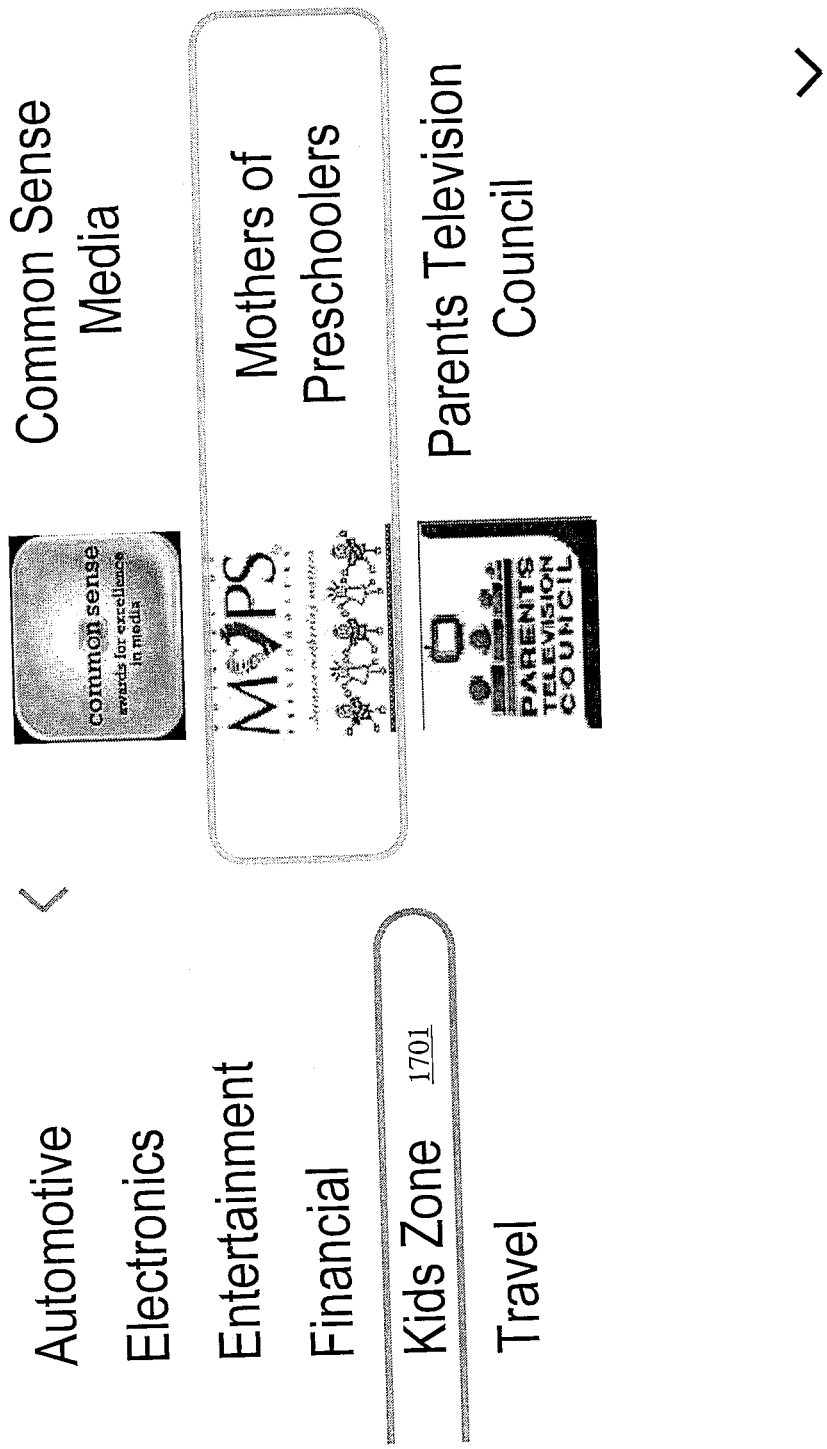
FIG. 17 illustrates an example of a DVR-presented screen that lists menu items that represent various categories of guru guides, according to an embodiment of the invention.

In one embodiment of the invention, user selection of the "add virtual channels" menu item 1201 shown in FIG. 12 causes DVR 102 to present, to the DVR user, the screen illustrated in FIG. 13. FIG. 13 illustrates an example of a DVR-presented screen 1300 that briefly introduces and explains the concept of virtual channels, according to an embodiment of the invention. In one embodiment of the invention, a user's selection of the "press SELECT to continue" menu item 1301 causes DVR 102 to present a screen that lists menu items that represent various categories of guru guides. Among these categories is a category labeled "kids zone channels." FIG. 17 illustrates an example of a DVR-presented screen 1700 that lists menu items that represent various categories of guru guides, according to an embodiment of the invention. In one embodiment of the invention, user selection of the menu item that represents the "kids zone channels" category 1701 causes DVR 102 to present, to the DVR user, the screen shown in FIG. 15.

Figure 15:
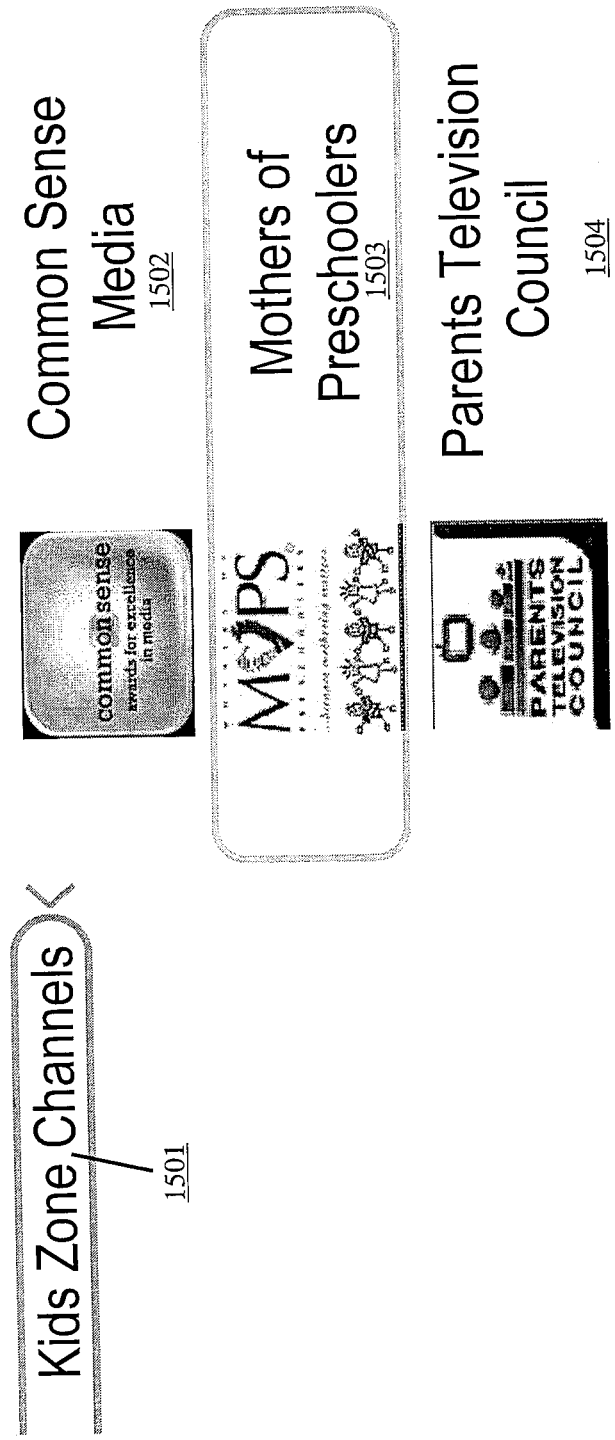
FIG. 15 illustrates an example of a DVR-presented screen that shows various different interested parties ("gurus") that a parent can select in order to view the recommended suggestion list ("guru guide") of that interested party, according to an embodiment of the invention.

FIG. 15 illustrates an example of a DVR-presented screen 1500 that shows various different interested parties ("gurus") that a parent can select in order to view the recommended suggestion list ("guru guide") of that interested party, according to an embodiment of the invention. FIG. 15 indicates that the category of guru guides currently being displayed in the "kids zone channels" category 1501. As shown in FIG. 15, the gurus who offer guru guides in this category include "Common Sense Media" 1502, "Mothers of Preschoolers" 1503, and "Parents Television Council" 1504. The set of gurus illustrated in FIG. 15 is merely an example; actual lists of gurus in this category may comprise more, fewer, or different gurus than those illustrated.

Figure 16:
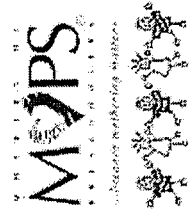
FIG. 16 illustrates an example of a DVR-presented screen that shows detailed information about a user-selected guru, according to an embodiment of the invention.

In one embodiment of the invention, user selection of a guru from among the several gurus shown in the screen of FIG. 15 causes DVR 102 to show a screen similar to the screen illustrated in FIG. 16. FIG. 16 illustrates an example of a DVR-presented screen 1600 that shows detailed information about a user-selected guru, according to an embodiment of the invention. In this example, the user-selected guru is "Mothers of Preschoolers" 1601 and the screen explains that the guru is an organization that cares about the education and development of toddlers. In one embodiment of the invention, the screen that shows details about a user-selected guru also indicates an age range for which the guru's recommended suggestions are, in the guru's opinion, appropriate.

The screen illustrated in FIG. 16 also comprises menu items for "add this channel" 1602, "view upcoming" 1603, and "don't do anything" 1604. In one embodiment of the invention, user selection of the "add this channel" menu item causes DVR 102 to add, to the white list of the kids zone's restriction criteria, all content items that are identified by any of the recommended suggestions in the guru guide that is associated with the user-selected guru. However, as is discussed above, in alternative embodiments of the invention, DVR 102 presents, to the DVR user, mechanisms by which the DVR user can view the recommended suggestions of the user-selected guru, and select some recommended suggestions but not others. In such embodiments of the invention, only the content items that are identified by the user-selected recommended suggestions are added to the white list of the kids zone's restriction criteria. Recommended suggestions from more than one guru's guru guide may be selected for the same kid zone. In one embodiment of the invention, the screen 1600 allows the user to cancel subscription to the guide if the user has already subscribed to the particular guru guide.

As is discussed above, in one embodiment of the invention, DVR 102 maintains one or more folders that correspond to different virtual channels. In one embodiment of the invention, for each virtual channel, DVR 102 places, in a folder that corresponds to that virtual channel, content items that are identified by the recommended suggestions that define that virtual channel. FIG. 22 illustrates an example of a DVR-presented screen 2200 that includes a folder that corresponds to a virtual channel, according to an embodiment of the invention. In the example illustrated, among other content items shown in the "kids zone now playing" list is a folder titled "Mothers of Preschoolers" 2201. The screen indicates that four content items are currently contained in the folder. DVR 102 automatically places, into this folder, only content items that are identified by the recommended suggestions in the "Mothers of Preschoolers" guru guide.

In one embodiment of the invention, user selection of the "view upcoming" menu item 1603 shown in FIG. 16 causes DVR 102 to present, to the DVR user, a screen that shows a list of content items that (a) are currently being broadcast or which will be broadcast in the near future and (b) are identified by the recommended suggestions in the user-selected guru's guru guide. In one embodiment of the invention, the content items are listed in order of how soon they are going to be broadcast, with the content items that are currently being broadcast, if any, listed first. In one embodiment of the invention, user selection of one or more content items from this list causes the selected content items to be added to the white list of the kids zone's restriction criteria, thus making the selected content items accessible from within the kids zone.

Figure 24:

FIG. 23 illustrates an example of a DVR-presented screen 2300 that contains detailed information about an upcoming episode of a television program, according to an embodiment of the invention. In one embodiment of the invention, a DVR user may cause DVR 102 to present such a screen by selecting a particular content item from the list of content items that DVR 102 shows in response to the user selection of the "view upcoming" menu item 1603 of FIG. 16. The screen shown in FIG. 23 includes menu items for "record this episode" 2301, "get a season pass" 2302, "view upcoming episodes" 2303, "kids zone" 2304, and "don't do anything" 2305. Next to the "kids zone" menu item 2304 is the text "not allowed" 2306, which indicates that this upcoming episode's attributes and characteristics do not currently satisfy the kids zone's restriction criteria. In contrast, in the screen shown in FIG. 24, next to the "kids zone" menu item 2401 is the text "allowed" 2402, which indicates that this upcoming episode's attributes and characteristics currently satisfy the kids zone's restriction criteria. In one embodiment of the invention, user selection of the "kids zone" menu item 2304, 2401, in the screens shown in FIGS. 23 and 24 causes DVR 102 to toggle the accessibility of the pertinent content item by adding the content item to the white list and removing the content item from the black list, or vice-versa.

In one embodiment of the invention, user selection of the "get a season pass" menu item 2302 causes DVR 102 to schedule the recording of all episodes of the pertinent content item that have never before been broadcast on the channel on which the pertinent content item is to be broadcast (i.e., all "first run" but not "repeat" episodes of the series) if the user selects a menu item "first run only." In one embodiment of the invention, selection of this menu item causes DVR 102 to add all such episodes to the white list. In one embodiment, the user can select other options to record programs for a season pass such as "all" for all showings and "repeats and first run."

3.2.2 Adding Content Items from the Now Playing List

Another way in which a parent may un-restrict selected content items for the kids zone is by selecting those content items from among content items that already have been obtained and stored by DVR 102. Some of the content items already obtained and stored by DVR 102 might have attributes or characteristics that currently do not satisfy the kids zone's restriction criteria, making those content items currently inaccessible from the kids zone.

As is illustrated in the example shown in FIG. 18, in one embodiment of the invention, a user may select a menu item labeled "add shows from the now playing list" 1802. User selection of this menu item causes DVR 102 to present, to the DVR user, a screen similar to the example screen shown in FIG. 19.

Figure 19:
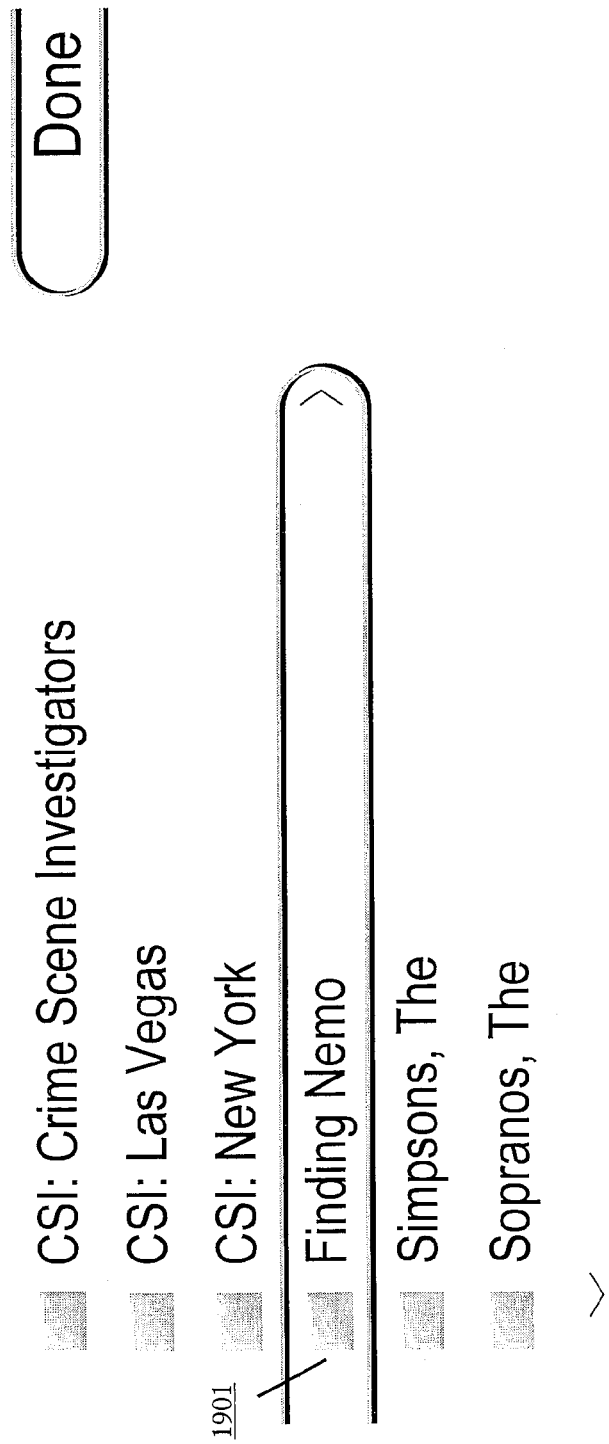
FIG. 19 illustrates an example of a DVR-presented screen that shows user-selectable content items that the DVR has already obtained and stored, according to an embodiment of the invention.

FIG. 19 illustrates an example of a DVR-presented screen 1900 that shows user-selectable content items that the DVR has already obtained and stored, according to an embodiment of the invention. In one embodiment of the invention, the content items shown on this screen are the same as those that would be shown in the general "now playing" list 800 of FIG. 8. As is shown in the example of FIG. 19, next to each content item's title is an empty checkbox 1901. In one embodiment of the invention, user selection of a content item's title causes DVR 102 to place and display a check mark in the checkbox 2001 next to that content item's title, as is illustrated in FIG. 20. After the DVR user has selected all of the currently stored content items that the DVR user wants to make accessible from the kids zone, the DVR user may select the "done" menu item 2002. In one embodiment of the invention, user selection of the "done" menu item 2002 causes DVR 102 to add, to the white list of the kids zone's restriction criteria, identities of all of the content items next to which a check mark has been placed.

In one embodiment of the invention, user selection of the "done" menu item 2002 causes DVR 102 to present a screen that informs the DVR user about which of the content items were made accessible from the kids zone. FIG. 21 illustrates an example of a DVR-presented screen 2100 that lists the selected content items that have been added to the kids zone 2101, according to an embodiment of the invention.

In one embodiment of the invention, the content items shown in the selection screen may include, among potentially other content items, content items that represent multi-episode series of a television program as well as content items that represent single episode instances of such multi-episode series. In such an embodiment of the invention, user selection of a content item that represents a single episode instance of a multi-episode series causes DVR 102 to check mark a content item that represents only that single episode instance to be check-marked without causing DVR 102 to check mark any content item that represents any other episode instance of that series. Under such circumstances, when the DVR user selects the "done" menu item 2002 as discussed above, single episode instances represented by the check-marked "single episode" content items will be added to the white list of the kids zone's restriction criteria, but the other unselected single episode instances of the same series will not be added to that white list. However, in the case of check-marked content items that represent whole multi-episode series, all of the episode instances of the series are added to the white list when the "done" menu item 2002 is selected.

3.2.3 Searching for Children's Content to Add

Another way that a parent can add content items to the white list of the kids zone's restriction criteria is by instructing DVR 102 to search for children's programming. In one embodiment of the invention, in response to a DVR user's selection of the "search for children's programming" menu item 1203 shown in FIG. 12, DVR 102 searches electronic schedules of to-be-broadcast content items for content items that have attributes and characteristics that signify that those content items are appropriate for viewing by children. In one embodiment of the invention, DVR 102 searches for content items whose attributes and characteristics satisfy the current restriction criteria that are associated with the kids zone.

Figure 14:
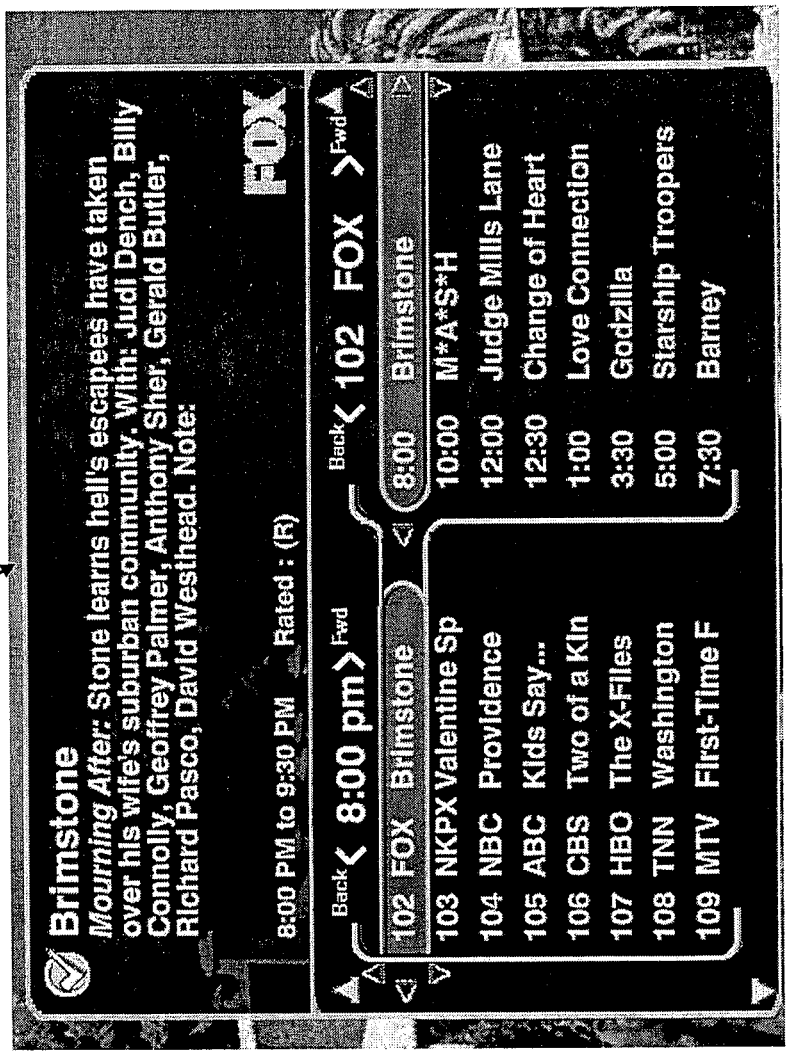
FIG. 14 illustrates an example of a DVR-presented Electronic Program Guide (EPG) screen, according to an embodiment of the invention.

According to one embodiment of the invention, DVR 102 provides an interface shown in FIG. 14 through which a parent can browse through an electronic programming guide ("EPG") 1400 during times that DVR 102 is not in the kids zone operational mode. An example of an EPG is described in U.S. Pat. No. 6,642,939 entitled "MULTIMEDIA SCHEDULE PRESENTATION SYSTEM", owned by the Applicant and incorporated by reference herein in its entirety. In response to the parent's selection (e.g., using the DVR remote control) of a content item that is identified in the EPG, DVR 102 presents a screen that shows detailed information about the selected content item. The detailed information may include the content item's title, a description of the content item's subject matter (e.g., plot), the year in which the content item was produced, the content item's rating, third-party reviews of the content item, etc. The third-party reviews may include reviews given and submitted by a ratings organization and/or by other users of other DVRs. Such reviews may indicate, for different age ranges of children, whether the reviewer deems the content item to be appropriate for viewing by children of those age ranges. In one embodiment of the invention, DVR 102 provides a mechanism through which parents can filter out, from the set of all reviews, reviews that are from people other than kids zone users or parents, leaving a set of reviews that are only from kids zone users or parents. Based on the reviews, a parent can either select or refrain from selecting various content items for inclusion within the white list of the kids zone's restriction criteria.

In one embodiment of the invention, in response to a DVR user's activation of a specified control (e.g., a specified button on the DVR remote control), DVR 102 receives user input that is indicative of a rating for a specified content item. The rating represents the DVR user's opinion concerning whether or not the specified content item is suitable for viewing by children of a specified age group. In one embodiment of the invention, DVR 102 sends (e.g., over a network) this user-supplied rating to a service provider. The service provider may compile one or more of such user-supplied ratings (which may be received from different users of different DVRs) and associate the ratings with the content items to which the ratings pertain. Thereafter, the service provider may provide (e.g., through a network), to various DVRs, compiled rating information from multiple different DVR users. Each DVR that receives such compiled rating information may present that rating information to the users of that DVR in connection with the content items to which the compiled rating information pertains. Thus, each DVR (e.g., DVRs 102 and 104, among others) may receive, for content items, ratings that are a collaborative product of a community of people.

3.3 Restricting Live Presentations and Descriptive Information

A DVR can play previously recorded content items, but also can present content items that are currently being broadcast or which are otherwise currently being obtained by the DVR. Content items that are currently being obtained or received by the DVR are called "live presentations." For example, a television program that is being broadcast on a channel to which the DVR is currently tuned is a "live presentation."

Often, a parent will not want their children to be able to view certain live presentations. In one embodiment of the invention, DVR 102 may be configured so that, during times that DVR 102 is in the kids zone operational mode, DVR 102 prevents itself from presenting any live presentation; DVR 102 may be configured so that, during such times, DVR 102 may not present any content item that DVR 102 has not already obtained and stored, even if that content item's attributes and characteristics actually do satisfy the kids zone's restriction criteria.

However, some parents might find this course of action overly restrictive. In an alternative embodiment of the invention, DVR 102 may be configured so that, during times that DVR 102 is in the kids zone operational mode, DVR 102 prevents the presentation of all live presentations that do not satisfy the kids zone's restriction criteria, but allows the presentation of live presentations that satisfy the kids zone's restriction criteria, even while DVR 102 is currently obtaining or receiving those live presentations.

Figure 25:
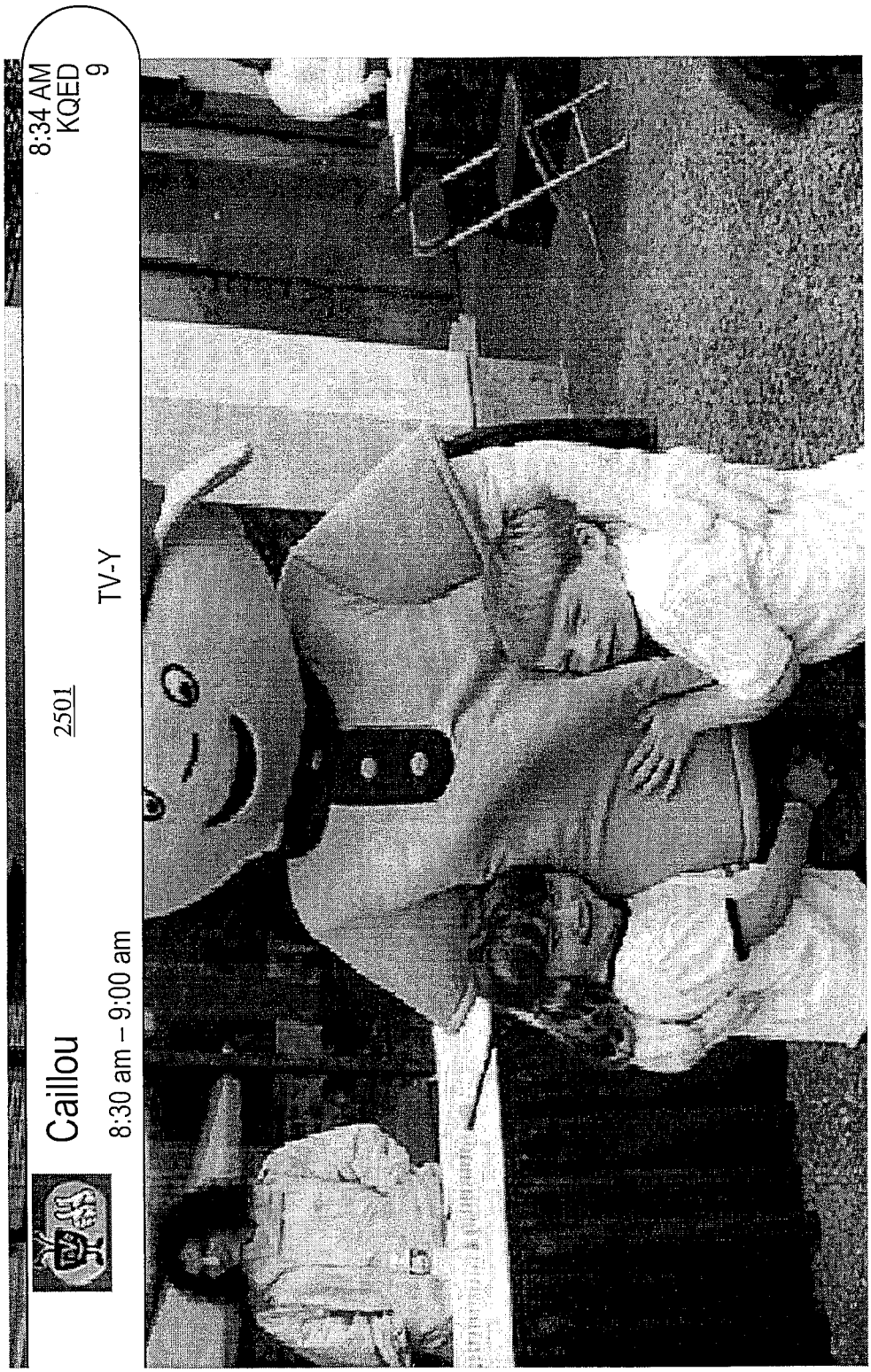
FIG. 25 illustrates an example of a DVR-presented screen that shows an informational banner that omits restricted kinds of information about a content item, according to an embodiment of the invention.

At various times, DVR 102 may present, to a DVR user, various kinds of information about a live presentation (e.g., in response to a user's pressing of an "info" button on a DVR remote control while a live presentation is being presented). In one embodiment of the invention, the information that DVR 102 is allowed to display about a live presentation is restricted to certain user-selected kinds of information about that presentation. For example, in one embodiment of the invention, DVR 102 may be configured to display, in an information bar, only information items such as a content item's title, the content item's rating, and the identity of the channel from which the content item is being received. FIG. 25 illustrates an example of a DVR-presented screen 2500 that shows an informational banner 2501 that omits restricted kinds of information about a content item, according to an embodiment of the invention. In one embodiment of the invention, DVR 102 prevents a description of the subject matter (e.g., plot) of a content item from being shown in any informational banner while DVR 102 is in the kids zone operational mode. Parents may find the deliberate exclusion of some kinds of information about content items to be useful, because information about some content items may include graphic descriptions that are unsuitable for children to see.

Although the description above refers to limiting the kinds of information that DVR 102 may present about a content item that is a live presentation, embodiments of the invention also include mechanisms by which specified kinds of information about other content items may be omitted from presentation while DVR 102 is in the kids zone operational mode. For example, in one embodiment of the invention, while DVR 102 is in the kids zone operational mode, certain parent-selected kinds of information (e.g., rating, plot description, etc.) are omitted from the EPG and/or other informational dialogs that DVR 102 might usually present in response to a user's pressing of a "guide" button on a DVR remote control. In one embodiment of the invention, whenever DVR 102 presents an EPG while DVR 102 is in the kids zone operational mode, DVR 102 omits, from the EPG, channels that are blocked according to the kids zone's restriction criteria. The absence of the blocked channels may be obscured from children by DVR 102 (a) closing the gap left by the absence of the blocked channels in the EPG and (b) omitting channel numbers from the EPG, thereby preventing children from deducing from non-sequential channel numbers that one or more channels are missing from the EPG. Alternatively, the blocked information may be visually obscured (e.g., by "graying out") the forbidden information in the EPG. In one embodiment of the invention, DVR 102 may be configured to prevent, entirely, any EPG from being presented while DVR 102 is in the kids zone operational mode.

In one embodiment of the invention, while DVR 102 is in the kids zone operational mode, instead of presenting a traditional EPG in which to-be-broadcast content items are presented in a time slot-column, channel row grid, DVR 102 instead presents a list that contains only content items that satisfy the kids zone restriction criteria. Next to each content item, DVR 102 may present the time at which the content item is scheduled to be broadcast. Such a list may omit the identities, including the channel numbers, of the channels on which the contents item will be broadcast. Thus, while DVR 102 is in the kids zone operational mode, information about upcoming blocked content items may be completely omitted from any information that DVR 102 presents to the DVR users. Such omission may be made to the extent that the DVR users are not even made aware, by any information that DVR 102 presents, that such blocked content items, and the channels on which they are broadcast, even exist.

Often, DVR remote controls and on-surface DVR consoles include controls that allow a DVR user to cause a DVR to tune to a channel with a next-highest or next-lowest number than the number of the channel to which the DVR is currently tuned. Indeed, if the EPG has been electively disabled entirely during times that the DVR is in the kids zone operational mode, the use of such controls may comprise the only means by which a DVR user can cause the DVR to change channels while the DVR is in such a mode. In one embodiment of the invention, during times that DVR 102 is in the kids zone operational mode, in response to a DVR user's activation of a control (e.g., a button on a remote control) that would ordinarily cause DVR 102 to tune to a channel with a next-highest channel number, DVR 102 determines whether (a) that channel is blocked by the kids zone's restriction criteria or (b) the content item currently being provided through that channel fails to satisfy the kids zone's restriction criteria. If DVR 102 determines that either of these conditions is true, then instead of tuning to that channel, DVR 102 performs the same determination relative to channel with the next-highest channel number after that. DVR 102 may repeat this process (unbeknownst to the DVR user) until DVR 102 has located a channel that is not blocked, and through which no restriction criteria-failing content item is currently being provided. Once DVR 102 has located such a channel, DVR 102 may tune to that channel. DVR 102 may employ a similar process in response to the DVR user's selection of a control that would ordinarily cause DVR 102 to tune to a channel with a next-lowest channel number, except that under such circumstances, DVR 102 would search for an appropriate channel in the opposite direction. DVR 102 also may employ a similar process in response to the DVR user's direct entry of a channel number of a kids zone-blocked channel, with DVR 102 unobtrusively finding and tuning to a next closest channel that is permissible in view of kids zone restrictions. In such an embodiment of the invention, DVR 102 may deliberately omit, from presentation to the DVR user, the number, name, and any other identification of the channel to which DVR 102 ultimately tunes, so that the DVR user remains completely oblivious to the fact that DVR 102 skipped any channel while tuning. DVR 102 may alternatively tune to the next higher or lower channel that is on the allowed kids zone channel list and then decide if the content item can be displayed or not displayed.

Figure 26:
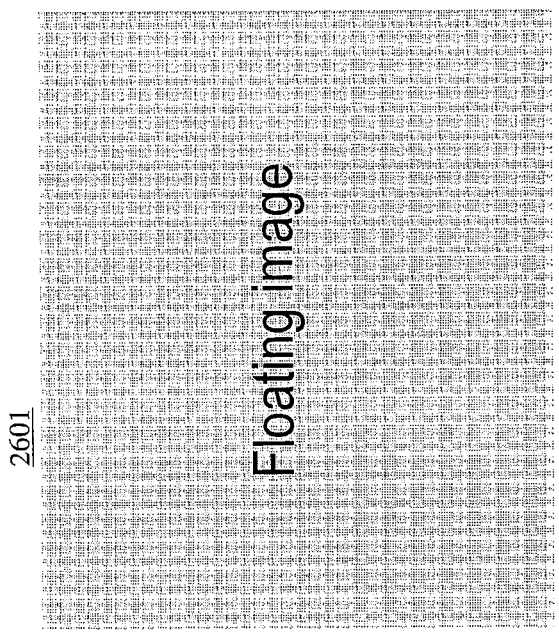
FIG. 26 illustrates an example of a DVR-presented screen that informs a user that the channel to which the user wants the DVR to tune is not available while the DVR is in the kids zone operational mode, according to an embodiment of the invention.

In one embodiment of the invention, during times that DVR 102 is in the kids zone operational mode, if DVR 102 is somehow tuned to a kids zone-blocked channel or a channel that is currently serving a kids zone-forbidden content item, then instead of presenting the content item that is currently being served on that channel, DVR 102 displays a screen such as the one that is illustrated in FIG. 26. FIG. 26 illustrates an example of a DVR-presented screen 2600 that informs a user that the channel to which the user wants the DVR to tune is not available while the DVR is in the kids zone operational mode, according to an embodiment of the invention. The screen may show a "floating" image 2601 (i.e., an image that moves about the screen in various directions) that children might enjoy watching. The screen may suggest that the DVR user tune to a different, kids zone-allowable channel, and/or the screen may suggest that the DVR user select a stored content item from the kids zone-allowable stored content items shown in the "kids zone now playing" list 2602. Alternatively, DVR 102 may automatically select and play one or more kids zone restriction criteria-satisfying content items that are already stored on DVR 102. In one embodiment of the invention, the DVR 102 may find that all of the tuners in the DVR are occupied recording programs that the parents have selected. In that case, the DVR 102 may display a screen 2700 in FIG. 27 that informs a user that the viewing of live presentations is not currently available.

In one embodiment of the invention, while DVR 102 is in the kids zone operational mode, DVR 102 may record or otherwise obtain and store a content item that was previously scheduled (outside of the kids zone) for recording, but whose presentation is not allowed during times that DVR 102 is in the kids zone operational mode. Under some DVR configurations, this will not cause any problems, because DVR 102 will be able to present content items from a kids zone-allowable channel while concurrently but secretly recording content items from another, kids zone-forbidden channel. However, if the DVR's configuration does not permit the viewing of one channel during the concurrent recording of content from another channel (e.g., if only one audiovisual input is currently connected to the DVR), then the DVR might need to perform a process that allows the scheduled recording to continue uninterrupted without presenting, to the DVR user, the content item currently being recorded.

Thus, in one embodiment of the invention, while DVR 102 is recording or otherwise obtaining and storing a content item whose recording or storage was scheduled prior to the placement of DVR 102 into the kids zone operational mode, DVR 102 prevents the channel from being changed in response to any user request or command. Under such circumstances, DVR 102 may ignore a user's activation of the channel-changing controls on the DVR remote control or the DVR on-surface console. In one embodiment of the invention, DVR 102 prevents the currently in-progress recording from being interrupted or canceled under such circumstances. Additionally, while DVR 102 is recording the content item under such circumstances, if the content item does not satisfy the kids zone's restriction criteria, or if the channel from which DVR 102 is receiving the content item is blocked by the kids zone's restriction criteria, then instead of presenting the content item that is currently being recorded, DVR 102 may display a screen such as the one illustrated in FIG. 27. FIG. 27 illustrates an example of a DVR-presented screen 2700 that informs a user that the viewing of live presentations is not currently available while the DVR is in the kids zone operational mode 2702, according to an embodiment of the invention. The screen may show a "floating" image 2701 (i.e., an image that moves about the screen in various directions) that children might enjoy watching. The screen may suggest that the DVR user select a stored content item from the kids zone-allowable stored content items shown in the "kids zone now playing" list. DVR 102 typically is able to play an already-stored content item at the same time that DVR 102 is recording another content item. Alternatively, DVR 102 may automatically select and play one or more kids zone restriction criteria-satisfying content items that are already stored on DVR 102.

Additionally, under circumstances where DVR 102 is recording, during times that DVR 102 is in the kids zone operational mode, a content item that DVR 102 cannot present due to that content item's failure to satisfy the kids zone's restriction criteria, the screen that DVR 102 presents instead of the content item, as described above, may omit (a) all information that identifies the content item that is being recorded and (b) all information that identifies that channel on which DVR 102 is receiving that content item. Thus, parents' privacy may be protected from the prying eyes of curious children who might not have the capacity to understand their parents' desires.

3.4 Handling Conflicting Scheduled Recordings

Under some circumstances, scheduling conflicts may arise. For example, a parent might have previously scheduled a recording of a first content item during a time at which DVR 102 was not in the kids zone operational mode. Later, while DVR 102 is in the kids zone operational mode, a child might attempt to schedule a recording of a second content item that satisfies the kids zone's restriction criteria, but which is to be broadcast during a time interval that at least partially overlaps with the time interval during which DVR 102 needs to record the first content item. In some cases, DVR 102 may be unable to record the first content item and the second content item simultaneously. This situation can occur when the DVR has a single tuner that can only record one program at a time. DVRs that have multiple tuners perform a conflict check for each tuner in the DVR.

In one embodiment of the invention, recordings of content items that were scheduled while DVR 102 was not in the kids zone operational mode are given a higher priority than recordings of content items that were scheduled while DVR 102 was in the kids zone operational mode. In such an embodiment of the invention, when a DVR user attempts to schedule a recording of a particular content item while DVR 102 is in the kids zone operational mode, DVR 102 determines whether that recording would conflict with any other recordings which were scheduled while DVR 102 was not in the kids zone operational mode. If there would be a conflict, then DVR 102 does not allow the scheduling of the recording of the particular content item. Instead, DVR 102 may inform the DVR user that the recording of the particular content item cannot be scheduled due to a conflict, without giving the DVR user any information about the identity or nature of the other content item(s) with which the recording of the particular content item would conflict. DVR 102 proceeds with the scheduled recording(s) of the content items that were scheduled while DVR 102 was not in the kids zone operational mode. In contrast, if a DVR user attempts to schedule a recording of a content item while DVR 102 is in the kids zone operational mode, and that recording would conflict only with other recordings that were also scheduled while DVR 102 was in the kids zone operational mode, then DVR 102 may provide the user with a choice of which recording should take priority over the others, and then schedule recordings according to the DVR user's choice.

In one embodiment of the invention, DVR 102 is configured to record, automatically, certain suggested content items. Such content items may be suggested (e.g., automatically selected by DVR 102) based on the previous recording activities of DVR 102. Additionally or alternatively, such content items may be suggested based on the age range that was selected when the kids zone was established. Additionally or alternatively, such content items may be suggested based on the restriction criteria that are associated with the kids zone. In one embodiment of the invention, a parent must go through the list of suggested content items that were recorded and manually allow programs in the list to appear in the kids zone now playing list. In one embodiment of the invention, DVR 102 can be configured either to allow DVR users to override the recordings of suggested content items while DVR 102 is in the kids zone operational mode, or to prevent DVR users from overriding the recording of suggested content items while DVR 102 is in the kids zone operational mode. In one embodiment of the invention, DVR 102 can be configured to allow recordings that are scheduled while DVR 102 is in the kids zone operational mode to take precedence over conflicting scheduled recordings of re-run content items, but not over conflicting scheduled recordings of first-run content items.

3.5 Executable Content

In one embodiment of the invention, DVR 102 is capable of downloading (e.g., over a network) and executing programs such as games and other applications. A service provider who provides these programs may associate these programs with ratings which indicate their suitability for users of different ages. In one embodiment of the invention, during times that DVR 102 is in the kids zone operational mode, DVR 102 does not permit the execution, by DVR 102, of any programs that are associated with ratings that fail to satisfy the kids zone's restriction criteria.

3.6 Automatic Standby Mode

In one embodiment of the invention, DVR 102 automatically enters into a standby mode after DVR 102 has not been used for at least a specified amount of time. DVR 102 may be configured to place itself in the kids zone operational mode automatically at any time that DVR 102 leaves standby mode (e.g., in response to some activity by the DVR user). DVR 102 may be configured to require the user submission of the correct password before DVR 102 will allow the kids zone operational mode to be exited.

Additionally, in one embodiment of the invention, DVR 102 may be configured to place itself in the kids zone operational mode automatically whenever DVR 102 powers on. Thus, in such an embodiment of the invention, if DVR 102 loses power due to a power outage, or due to a child resetting or unplugging DVR 102, DVR 102 will automatically resume operation within the kids zone after power is restored. This feature helps to prevent children from "working around," through nefarious means, the parental restrictions imposed by the kids zone.

3.7 Requesting Parental Approval of Recording in Kids Zone

In one embodiment of the invention, DVR 102 may be configured to prevent, entirely, the scheduling of any recording or storage of any content items during times that DVR 102 is in the kids zone operational mode. Alternatively, DVR 102 may be configured to allow, during times that DVR 102 is in the kids zone operational mode, the scheduling of the recording or storage of content items that satisfy the kids zone's restriction criteria, but only those content items.

In one embodiment of the invention, DVR 102 provides an interface through which a DVR user such as a child can request the future recording of a particular content item that is not currently allowed in the kids zone. In such an embodiment of the invention, DVR 102 provides an interface through which a DVR user such as a parent can view such requests while DVR 102 is not in the kids zone operational mode. Through this latter interface, DVR 102 may receive the parent's approval or denial of the requests that were made while DVR 102 was in the kids zone operational mode. In one embodiment of the invention, when a parent approves such a request, DVR 102 responsively schedules the recording of the requested content item, provided that the recording does not conflict with another higher priority scheduled recording. Additionally, once the requested and approved content item has been recorded, DVR 102 makes the presentation of that content item available to DVR users while DVR 102 is in the kids zone operational mode.

3.8 Handling Failed Password Attempts

In one embodiment of the invention, DVR 102 may be configured to take specified action in response to receiving a specified number of incorrect passwords. For example, DVR 102 may be configured so that, in response to receiving an incorrect password, DVR 102 does not allow the DVR user to re-attempt to enter the password until a specified duration of time has passed. In one embodiment of the invention, the length of this duration automatically increases with each consecutive entry of an incorrect password.

In one embodiment of the invention, DVR 102 is configured to not permit use of the menus or playing of programs automatically, and to refrain from restarting for a specified duration of time, in response to receiving, consecutively, a specified number of incorrect passwords. For example, after DVR 102 has received five incorrect passwords, uninterrupted by the receipt of any correct passwords, DVR 102 may shut off and prevent itself from restarting for a duration of four hours.

3.9 Restricting Presentation Through Play Lists

In one embodiment of the invention, while DVR 102 is not in the kids zone operational mode, DVR 102 receives, from a DVR user such as a parent, a set of identities of user-selected content items. DVR 102 also receives, from the DVR user, a command which places DVR 102 into a "play list" mode of operation. In this mode of operation, DVR 102 is in the kids zone operational mode, but DVR 102 will present each of the content items that are in the selected set, one after another, and only those content items. In one embodiment of the invention, if DVR 102 is currently in the "play list" operational mode and DVR 102 has finished presenting all of the content items in the selected set, then DVR 102 automatically shuts off and will not restart for a specified duration of time. In one embodiment of the invention, if DVR 102 is currently in the "play list" operational mode and DVR 102 has finished presenting all of the content items in the selected set, then DVR 102 prevents any other content items from being presented until the correct password is submitted.

In one embodiment of the invention, in addition to the set of selected content items, DVR 102 receives user input that specifies a maximum duration of time that the "play list" mode of operation should be active. In one embodiment of the invention, if DVR 102 is currently in the "play list" operational mode, then, after an amount of time equal to the specified maximum duration has passed since the time that DVR 102 was placed in the "play list" operational mode, DVR 102 automatically shuts off and will not restart for a specified duration of time. In one embodiment of the invention, if DVR 102 is currently in the "play list" operational mode, then after an amount of time equal to the specified maximum duration has passed since the time that DVR 102 was placed in the "play list" operational mode, DVR 102 prevents any other content items from being presented until the correct password is submitted.

3.10 Restricting Presentation Through Timers

In one embodiment of the invention, while DVR 102 is not in the kids zone operational mode, DVR 102 receives, from a DVR user such as a parent, a specified amount of time to which a timer is to be set. DVR 102 also receives, from the DVR user, a command which places DVR 102 into a "timed" mode of operation. In this mode of operation, DVR 102 is in the kids zone operational mode, but DVR 102 will only allow content items to be presented for a limited time after being placed in the "timed" operational mode. In one embodiment of the invention, if DVR 102 is currently in the "timed" operational mode, then after an amount of time equal to the specified timer amount has passed since the time that DVR 102 was placed in the "timed" operational mode, DVR 102 automatically shuts off and will not restart for another specified duration of time. In one embodiment of the invention, if DVR 102 is currently in the "timed" operational mode, then after an amount of time equal to the specified timer amount has passed since the time that DVR 102 was placed in the "timed" operational mode, DVR 102 prevents any other content items from being presented until the correct password is submitted. DVR 102 may present a screen that informs the DVR user that the allotted kids zone maximum viewing time has been reached.

In one embodiment of the invention, the "timer" only runs while DVR 102 is in the kids zone operational mode; during intervals of time while DVR 102 is not in the kids zone operational mode (including intervals of time during which DVR 102 is not powered on), the "timer" temporarily stops running until DVR 102 is placed once again into the kids zone operational mode. Thus, a parent may use the "timer" feature to prevent their children from watching more than a parent-approved amount of television in the kids zone.

In one embodiment of the invention, while DVR 102 is not in the kids zone operational mode, DVR 102 receives, from a DVR user such as a parent, information that specifies a starting time-of-day and an ending time-of-day. In such an embodiment of the invention, after the starting and ending times-of-day have been specified, DVR 102 does not allow content items to be presented during times-of-day that DVR 102 is in the kids zone operational mode unless those times-of-day fall within the time interval defined by the starting and ending times-of-day. In one embodiment of the invention, rather than receiving, from the DVR user, information that specifies only one starting time-of-day and one ending time-of-day, DVR 102 receives information that specifies separate starting and ending times-of-day for each day of the week. DVR 102 enforces these time-of-day restrictions based on which day of the week the current day falls.

3.11 Restricting Presentation of DVD Content

Expanding upon the methods described throughout for allowing and not allowing content items to be displayed while the DVR 102 is in the kids zone operational mode, the DVR 102 can allow a parent to filter DVD content and create white and black lists. A DVR with an integrated DVD player/recorder is described in U.S. patent application Ser. No. 10/418, 646, entitled "DIGITAL VIDEO RECORDER SYSTEM WITH AN INTEGRATED DVD RECORDING DEVICE", owned by the Applicant and incorporated by reference herein in its entirety.

When a DVD is loaded into the DVD player integrated in the DVR 102, the DVR 102 reads the DVD's content information included in the DVD. The DVD content information may include the DVD content's title, rating (possibly an MPAA rating), actor names, director name, genre, etc. The parent has the ability to define many aspects of the DVR's ability to automatically filter DVD content in the same manner as content items are allowed or not allowed.

Figure 34:
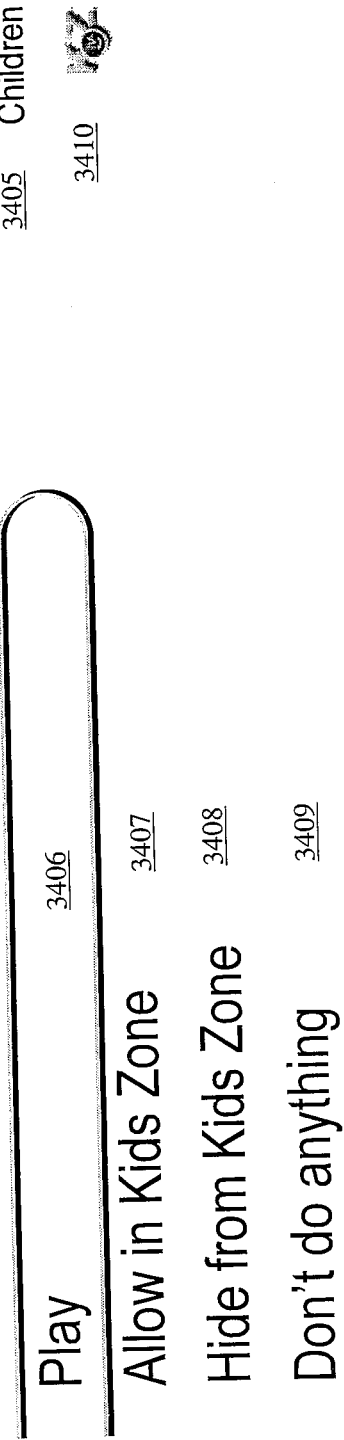
FIG. 34 illustrates an example of a DVR-presented screen that contains detailed information about a DVD's content, according to an embodiment of the invention.

The DVD's title and other information are processed by the DVR 102 and appear on the Now Playing list 800. In one embodiment of the invention, a user can see that the DVD is listed on the Now Playing list and select the DVD to determine if the DVD's content can be viewed in the kids zone operational mode. FIG. 34 illustrates an example of a DVR-presented screen 3400 that contains detailed information about the content on the DVD. In the example shown, the DVD content has a title of "Thomas & Friends" 3401. The screen has a synopsis (if included in the DVD) of the content. In one embodiment of the invention, DVR 102 obtains any missing information such as the synopsis from a DVD catalog over the Internet connection. The screen also shows the content item's rating 3403 (in this case, "TV-Y"), a brief explanation of the content item's genre/category established by the guide data provider 3404 (in this case, "Children"), the content item's duration 3405. In one embodiment of the invention, the "KZ" icon 3410 is shown to indicate that the DVD content passes the kids zone's restriction criteria.

In the example shown, the menu items include items such as "play" 3406, "allow in kids zone" 3407, "hide from kids zone" 3408, and "don't do anything" 3409. In one embodiment of the invention, user selection of the "play" menu item 3406 causes DVR 102 to play the DVD. In one embodiment of the invention, user selection of the "allow in kids zone" menu item 3407 causes DVR 102 to add the DVD's content information to the kids zone white list. In one embodiment of the invention, user selection of the "hide from kids zone" menu item 3408 causes DVR 102 to add the DVD's content information to the kids zone black list. In one embodiment of the invention, user selection of the "don't do anything" menu item 3409 causes DVR 102 to go back to the now playing list. The user can edit the white or black list to remove an item from the list or, once an item is on either list, DVR 102 displays a menu item to remove the item from the respective list when a screen such as screen 3400 is displayed to the user.

If the DVD content is approved by the user and can be played in the kids zone operational mode, then DVR 102 saves the DVD's content information in the white list. If the user decides that the DVD's content is not suitable for playing in the kids zone operational mode, then DVR 102 adds the DVD's content information to the black list. The DVR 102 can reference the white list and black list to determine if a DVD that has been inserted into the DVD player can be played in the kids zone operational mode. Users can insert DVDs that they own into the DVD player in DVR 102 to catalog the DVDs and set the viewing permissions for each DVD.

In one embodiment of the invention, DVR 102 is connected to the Internet. A user can display via DVR 102 a catalog of published DVDs. DVR 102 accesses the catalog through its Internet connection. The catalog can be provided by a service or any other source, e.g., a guru guide that lists DVDs. The user can search and select DVDs in a list, e.g., using a screen 2000, that the user owns and place each DVD on the white or black list. This saves the user from having to insert each DVD into the DVD player in DVR 102 and determine settings for each DVD.

In one embodiment of the invention, a user can enter keywords or DVD content titles and place them on the white or black list. Using keywords allows the user to enter partial titles in case the user does not correctly remember a DVD content's title. DVR 102 uses the keywords or title to classify a DVD when it is inserted into the DVD player in DVR 102.

In one embodiment of the invention, a user can set allowable ratings levels for DVDs as he would for content items described above. DVR 102 will look at a DVD's rating and determine if the DVD is viewable in kids zone operational mode when DVR 102 is in that mode. If the DVD does not have a rating included in the DVD content, DVR 102 can obtain the DVD's rating by referencing a DVD catalog or database accessible via the Internet. DVR 102 can save the rating as well as the DVD's content information on a hard rive or storage device for future reference.

In one embodiment of the invention, DVR 102 also allows a user to save content stored on a hard disk or storage device onto a recordable DVD. The user can save his own title and rating onto the DVD. This allows the user to create DVDs that conform to ratings, title, and/or keyword settings that the user has established on DVR 102. Given that the user has set the rating of the DVD to a standard rating, this also allows another user to play the DVD on his DVR and have the DVR filter the DVD using his own rules.

3.12 Logging DVR Activity

In one embodiment of the invention, during times that DVR 102 is in the kids zone operational mode, DVR 102 maintains a log of (a) the channels to which DVR 102 was tuned while in the kids zone operational mode, (b) the content items (live or previously recorded) that DVR 102 presented while in the kids zone operational mode, and/or (c) the content items that DVR 102 scheduled for recording while DVR 102 was in the kids zone operational mode. In one embodiment of the invention, DVR 102 presents the log to a DVR user such as a parent in response to the parent's selection of a corresponding menu item, and, in one embodiment of the invention, the parent's submission of the correct password. Thus, by viewing the log, parents can keep tabs on what their children have been doing relative to DVR 102.

3.13 Restricting Advertisements

Although a content item such as a television program or movie might have a rating associated with it by some ratings organization, advertisements that are dispersed throughout breaks in the content item usually will not have any associated rating. Nevertheless, parents might want to prevent their children from seeing certain kinds of advertisements.

In one embodiment of the invention, DVR 102 is configured to block all advertisements that originate from parent-specified advertisers. In one embodiment of the invention, DVR 102 is configured to block all advertisements that pertain to parent-specified brands. DVR 102 may receive, from a DVR user such as a parent, information that specifies a list of advertisers whose advertisements DVR 102 should block. Additionally or alternatively, DVR 102 may receive, from a DVR user such as a parent, information that specifies a list of parent-forbidden brands. Thereafter, during times that DVR 102 is in the kids zone operational mode, DVR 102 prevents the presentation of (a) all advertisements that DVR 102 determines to be from any of the advertisers on the list and (b) all advertisements that DVR 102 determines to pertain to any of the brands on the list.

In one embodiment of the invention, DVR 102 automatically identifies the advertiser from which an advertisement originates and/or the brand to which an advertisement pertains by inspecting metadata that is associated with that advertisement. For example, DVR 102 may determine the advertiser and/or brand by inspecting "closed caption" tags, or other embedded tags, that accompany the advertisement. In response to locating, in the metadata, a word or set of words that are known to occur in an advertisement from a forbidden advertiser or an advertisement that pertains to a forbidden brand, DVR 102 may (a) present alternative, child-appropriate content during the time interval that the advertisement occupies, or (b) skip over the advertisement if the advertisement is being presented from previously stored content on DVR 102. For another example, in response to locating, in the metadata, a tag that was inserted by a service provider or other party, and which indicates a rating of the advertisement, DVR 102 may determine whether the rating is allowed by the kids zone's restriction criteria, and if not, then DVR 102 may take actions such as those described above relative to the advertisement. Some example techniques for identifying advertisements in a program stream are described in U.S. patent application Ser. No. 09/665,921, entitled "CLOSED CAPTION TAGGING SYSTEM" and U.S. patent application Ser. No. 11/473,543, entitled "IN-BAND DATA RECOGNITION AND SYCHRONIZATION SYSTEM" both owned by the Applicant and incorporated by reference herein in their entirety.

The service provider can charge a fee to kid-friendly advertisers to display their ads in place of ads that are on the forbidden brand or advertiser list. The DVR can randomly select an advertisement from a pool of paid advertiser advertisements or it can display advertisements from the pool based on a priority list provided by the service provider that specifies which advertisements should be displayed first. The priority list can also specify the frequency and/or time of day that specific advertisements should be displayed. This allows the service provider to have different fee levels depending on how frequent the advertiser wants their advertisement displayed. An advertiser can also be more specific and pay a fee to have a specific advertisement displayed during a certain day, date, and/or time of day in order to have a more precise audience targeting.

In one embodiment, parents can have access to parent-specified brand and advertiser blocking for free and the DVR selects advertisements from a paid advertiser pool to display to the viewer when an advertisement is blocked. Parents can pay a fee to the service provider to get advertisement blocking without advertisements being replaced by the DVR.

3.14 Multiple Kids Zones on the Same DVR

In one embodiment of the invention, DVR 102 is capable of establishing multiple separate kids zones in response to a DVR user's requests. Each kids zone may be mapped to a different user-selected age range or viewer category. Each kids zone may be associated with different user-selected restriction criteria. Thus, content items which are allowable in one kids zone might be blocked in another kids zone. In one embodiment of the invention, when a kids zone is established, DVR 102 asks the DVR user to provide a name or identifier by which the kids zone will be known. DVR 102 stores the provided name or identifier in association with the kids zone just established. In one embodiment of the invention, when DVR 102 receives a command that directs DVR 102 to enter a kids zone, if more than one kids zone has been established on DVR 102, then DVR 102 presents, to the DVR user, the names or identifiers of the several established kids zones, and asks the DVR user to select one. In response to receiving the DVR user's selection of a particular kids zone, DVR 102 places itself in the particular kids zone operational mode, thereafter allowing and blocking content items based on the restriction criteria that are associated with that particular kids zone.

In one embodiment, remote controls that are coded for family members or remote controls that identify people via ID chips implanted somewhere in the person or worn by the person are used to identify a user and whether a certain kids zone is to be activated or, in the case of a parent's remote control or ID chip being identified, whether kids zone should be deactivated. An example of custom remote control identification is described in U.S. Pat. No. 6,868,225, entitled "MULTIMEDIA PROGRAM BOOKMARKING SYSTEM" owned by the Applicant and incorporated by reference herein in its entirety.

In one embodiment of the invention, a remote control is either coded or designed specifically for kids zone use. A remote control that has been designed specifically for kids zone use may have only the keys necessary for a child to select and play programs as well as performing trick play functions on a program. Other keys such as record, guide, thumbs up/down may not be needed and can be eliminated from a remote designed specifically for kids zone.

4.0 Example DVR

Figure 32:
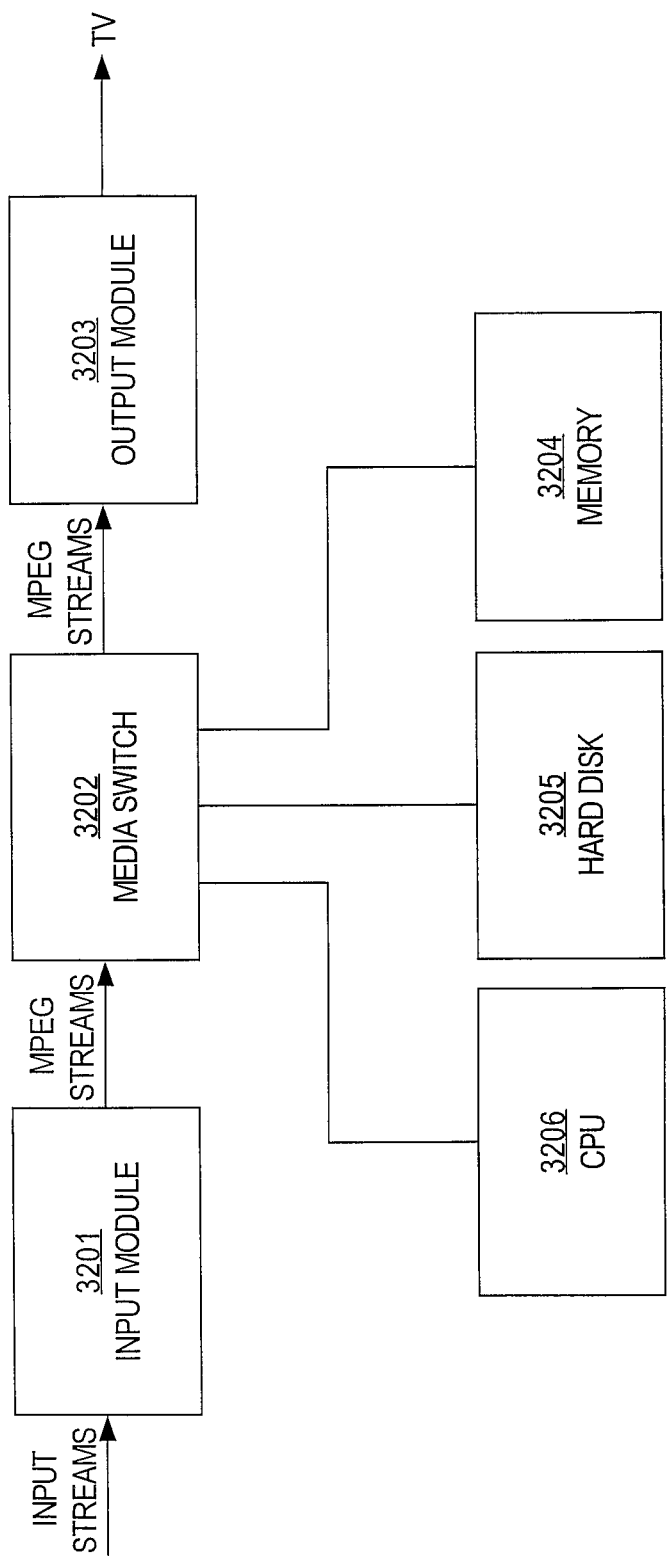
FIG. 32 is a block diagram that shows an example of the internal structure and operation of a DVR, according to an embodiment of the invention.

FIG. 32 is a block diagram that shows an example of the internal structure and operation of a DVR, according to an embodiment of the invention. An example of the internal structure and operation of a DVR is further described in U.S. Pat. No. 6,233,389, which is incorporated by reference as though originally disclosed herein.

The DVR shown in FIG. 32 comprises an input module 3201, a media switch 3202, and an output module 3203. Input module 3201 receives television (TV) input streams in any of a variety of forms. For example, a TV input stream received by input module 3201 may take the form of a National Television Standards Committee (NTSC) compliant signal or a PAL compliant broadcast signal. For another example, a TV input stream received by input module 3201 may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. According to one embodiment of the invention, input module 3201 produces MPEG streams. According to another embodiment of the invention, input module 3201 produces streams that are encoded using a different codec.

An MPEG-2 transport multiplex supports multiple programs in the same broadcast channel, which multiple video and audio feeds and private data. Input module 3201 tunes the channel to a particular program, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input module 3201 and passed to the other modules as if the signals had been delivered via an MPEG-2 private data channel.

Media switch 3202 mediates between a microprocessor CPU 3206, a hard disk or storage device 3205, and memory 3204. Input streams are converted to an MPEG stream and sent to media switch 3202. Media switch 3202 buffers the MPEG stream into memory 3204. Media switch 3202 then performs two operations if the DVR user is watching real-time TV: media switch 3202 sends the MPEG stream to output module 3203 and simultaneously writes the MPEG stream to hard disk or storage device 3205.

Output module 3203 receives MPEG streams as input and produces an analog TV signal according to NTSC, PAL, or other TV standards. Output module 3203 comprises an MPEG decoder, an on-screen display (OSD) generator, an analog TV encoder, and audio logic. The OSD generator allows the program logic to supply images which may be overlaid on top of the resulting TV analog signal. Additionally, output module 3203 can modulate information supplied by the program logic onto the VBI of the output signal in a number of standard formats, including NABTS, CC, and EDS.

5.0 Hardware Overview

Figure 33:
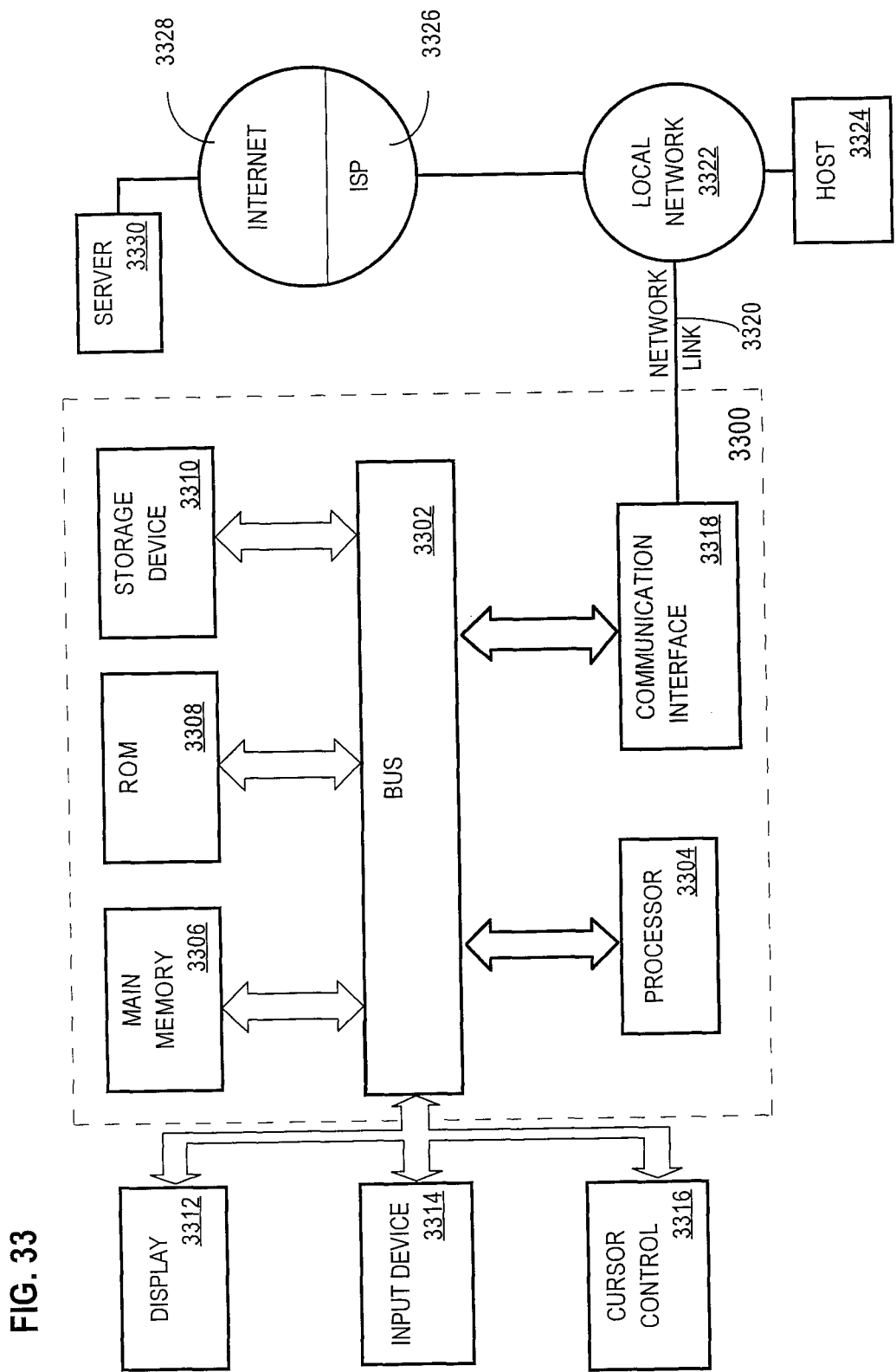
FIG. 33 is a block diagram of a system on which embodiments of the invention may be implemented.

FIG. 33 is a block diagram that illustrates a computer system 3300 upon which an embodiment of the invention may be implemented. Computer system 3300 includes a bus 3302 or other communication mechanism for communicating information, and a processor 3304 coupled with bus 3302 for processing information. Computer system 3300 also includes a main memory 3306, such as a random access memory (RAM) or other dynamic storage device, coupled to bus 3302 for storing information and instructions to be executed by processor 3304. Main memory 3306 also may be used for storing temporary variables or other intermediate information during execution of instructions to be executed by processor 3304. Computer system 3300 further includes a read only memory (ROM) 3308 or other static storage device coupled to bus 3302 for storing static information and instructions for processor 3304. A storage device 3310, such as a magnetic disk or optical disk, is provided and coupled to bus 3302 for storing information and instructions.

Computer system 3300 may be coupled via bus 3302 to a display 3312, such as a cathode ray tube (CRT), for displaying information to a computer user. An input device 3314, including alphanumeric and other keys, is coupled to bus 3302 for communicating information and command selections to processor 3304. Another type of user input device is cursor control 3316, such as a mouse, a trackball, or cursor direction keys for communicating direction information and command selections to processor 3304 and for controlling cursor movement on display 3312. This input device typically has two degrees of freedom in two axes, a first axis (e.g., x) and a second axis (e.g., y), that allows the device to specify positions in a plane.

The invention is related to the use of computer system 3300 for implementing the techniques described herein. According to one embodiment of the invention, those techniques are performed by computer system 3300 in response to processor 3304 executing one or more sequences of one or more instructions contained in main memory 3306. Such instructions may be read into main memory 3306 from another machine-readable medium, such as storage device 3310. Execution of the sequences of instructions contained in main memory 3306 causes processor 3304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 3300, various machine-readable media are involved, for example, in providing instructions to processor 3304 for execution. Such a medium may take many forms, including but not limited to, non-volatile media, volatile media, and transmission media. Non-volatile media includes, for example, optical or magnetic disks, such as storage device 3310. Volatile media includes dynamic memory, such as main memory 3306. Transmission media includes coaxial cables, copper wire and fiber optics, including the wires that comprise bus 3302. Transmission media can also take the form of acoustic or light waves, such as those generated during radio-wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 3304 for execution. For example, the instructions may initially be carried on a magnetic disk of a remote computer. The remote computer can load the instructions into its dynamic memory and send the instructions over a telephone line using a modem. A modem local to computer system 3300 can receive the data on the telephone line and use an infra-red transmitter to convert the data to an infra-red signal. An infra-red detector can receive the data carried in the infra-red signal and appropriate circuitry can place the data on bus 3302. Bus 3302 carries the data to main memory 3306, from which processor 3304 retrieves and executes the instructions. The instructions received by main memory 3306 may optionally be stored on storage device 3310 either before or after execution by processor 3304.

Computer system 3300 also includes a communication interface 3318 coupled to bus 3302. Communication interface 3318 provides a two-way data communication coupling to a network link 3320 that is connected to a local network 3322. For example, communication interface 3318 may be an integrated services digital network (ISDN) card or a modem to provide a data communication connection to a corresponding type of telephone line. As another example, communication interface 3318 may be a local area network (LAN) card to provide a data communication connection to a compatible LAN. Wireless links may also be implemented. In any such implementation, communication interface 3318 sends and receives electrical, electromagnetic or optical signals that carry digital data streams representing various types of information.

Network link 3320 typically provides data communication through one or more networks to other data devices. For example, network link 3320 may provide a connection through local network 3322 to a host computer 3324 or to data equipment operated by an Internet Service Provider (ISP) 3326. ISP 3326 in turn provides data communication services through the world wide packet data communication network now commonly referred to as the "Internet" 3328. Local network 3322 and Internet 3328 both use electrical, electromagnetic or optical signals that carry digital data streams. The signals through the various networks and the signals on network link 3320 and through communication interface 3318, which carry the digital data to and from computer system 3300, are exemplary forms of carrier waves transporting the information.

Computer system 3300 can send messages and receive data, including program code, through the network(s), network link 3320 and communication interface 3318. In the Internet example, a server 3330 might transmit a requested code for an application program through Internet 3328, ISP 3326, local network 3322 and communication interface 3318.

The received code may be executed by processor 3304 as it is received, and/or stored in storage device 3310, or other non-volatile storage for later execution. In this manner, computer system 3300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
at a multimedia device, storing information that specifies one or more specified brands and/or one or more specified advertisers;
based on inspecting captioning data that accompanies multimedia content, locating within the captioning data one or more words known to occur in advertisements that are associated with at least one of the one or more specified brands and/or the one or more specified advertisers;
based at least partially on locating the one or more words in the captioning data, automatically identifying in the multimedia content, by the multimedia device, an advertisement that is associated with at least one of the one or more specified advertisers and/or at least one of the one or more specified brands;
in response to identifying the advertisement, while playing the multimedia content at the multimedia device, performing at least one of:
presenting alternative content during a time interval that the advertisement occupies in the multimedia content; or
skipping over the advertisement in the multimedia content.

2. The method as recited in claim 1, further comprising:
selecting, at the multimedia device, the alternate content to display during the time interval based at least partially on priority data that specifies at least one of: a frequency or a time of day that specific alternative content can be displayed;
presenting the alternative content during the time interval.

3. The method of claim 1, further comprising:
presenting the alternative content during the time interval that the advertisement occupies in the multimedia content
selecting, by the multimedia device, the alternative content to display from a pool of alternative advertisements.

4. The method of claim 1, further comprising:
determining an operational mode, of a plurality of operational modes, in which the multimedia device is operating;
wherein presenting the alternate content or skipping the advertisement is responsive to determining that the multimedia device is operating in a first operational mode rather than a second operational mode.

5. The method of claim 1, further comprising:
determining a user identifier for a current user of the multimedia device;
wherein the multimedia device is configured to present alternative content for and/or skip different advertisements for different determined user identifiers.

6. The method of claim 1, further comprising selecting between presenting the alternative content or skipping over the advertisement based on data indicating whether a user of the multimedia device has paid a fee.

7. The method recited in claim 1, further comprising, in response to identifying the advertisement, skipping the advertisement.

8. A non-transitory computer-readable storage medium storing one or more sequences of instructions, which instructions, when executed by one or more processors, cause the one or more processors to perform steps that comprise:
at a multimedia device, storing information that specifies one or more specified brands and/or one or more specified advertisers;
based on inspecting captioning data that accompanies multimedia content, locating within the captioning data one or more words known to occur in advertisements that are associated with at least one of the one or more specified brands and/or the one or more specified advertisers;
based at least partially on locating the one or more words in the captioning data, automatically identifying in the multimedia content, by the multimedia device, an advertisement that is associated with at least one of the one or more specified advertisers and/or at least one of the one or more specified brands;
in response to identifying the advertisement, while playing the multimedia content at the multimedia device, performing at least one of:
presenting alternative content during a time interval that the advertisement occupies in the multimedia content; or
skipping over the advertisement in the multimedia content.

9. The non-transitory computer-readable storage medium as recited in claim 8, wherein the instructions, when executed by the one or more processors, cause the one or more processors to perform:
selecting, at the multimedia device, the alternate content to display during the time interval based at least partially on priority data that specifies at least one of: a frequency or a time of day that specific alternative content can be displayed;
presenting the alternative content during the time interval.

10. The non-transitory computer-readable storage medium as recited in claim 8, wherein the instructions, when executed by the one or more processors, further cause the one or more processors to perform:
presenting the alternative content during the time interval that the advertisement occupies in the multimedia content
selecting, by the multimedia device, the alternative content to display from a pool of alternative advertisements.

11. The non-transitory computer-readable storage medium as recited in claim 8, wherein the instructions, when executed by the one or more processors, further cause the one or more processors to perform:
determining an operational mode, of a plurality of operational modes, in which the multimedia device is operating;
wherein presenting the alternate content or skipping the advertisement is responsive to determining that the multimedia device is operating in a first operational mode rather than a second operational mode.

12. The non-transitory computer-readable storage medium as recited in claim 8, wherein the instructions, when executed by the one or more processors, further cause the one or more processors to perform:
determining a user identifier for a current user of the multimedia device;
wherein the multimedia device is configured to present alternative content for and/or skip different advertisements for different determined user identifiers.

13. The non-transitory computer-readable storage medium as recited in claim 8, wherein the instructions, when executed by the one or more processors, further cause the one or more processors to perform selecting between presenting the alternative content or skipping over the advertisement based on data indicating whether a user of the multimedia device has paid a fee.

14. The non-transitory computer-readable storage medium recited in claim 8, wherein the instructions, when executed by the one or more processors, further cause the one or more processors to perform, in response to identifying the advertisement, skipping the advertisement.

15. An apparatus comprising:
a subsystem, implemented at least partially in hardware, configured to store information that specifies one or more specified brands and/or one or more specified advertisers;
a subsystem, implemented at least partially in hardware, configured to, based on inspecting captioning data that accompanies multimedia content, locate within the captioning data one or more words known to occur in advertisements that are associated with at least one of the one or more specified brands and/or the one or more specified advertisers specified in the preference information;
a subsystem, implemented at least partially in hardware, configured to, based at least partially on locating the one or more words in the captioning data, automatically identify, in the multimedia content, an advertisement that is associated with at least one of the one or more specified advertisers and/or at least one of the one or more specified brands;

a subsystem, implemented at least partially in hardware, configured to, in response to identifying the advertisement, while playing the multimedia content, perform at least one of:
   presents alternative content during a time interval that the advertisement occupies in the multimedia content; or
   skips over the advertisement in the multimedia content.

16. The apparatus as recited in claim 15, further comprising:
   a subsystem, implemented at least partially in hardware, that is configured to select the alternate content to display during the time interval based at least partially on priority data that specifies at least one of: a frequency or a time of day that specific alternative content can be displayed;
   a subsystem, implemented at least partially in hardware, that is configured to present the alternative content during the time interval.

17. The apparatus as recited in claim 15, further comprising:
   a subsystem, implemented at least partially in hardware, configured to present the alternative content during the time interval that the advertisement occupies in the multimedia content
   a subsystem, implemented at least partially in hardware, configured to select the alternative content to display from a pool of alternative advertisements.

18. The apparatus as recited in claim 15, further comprising:
   a subsystem, implemented at least partially in hardware, configured to determine an operational mode, of a plurality of operational modes, in which the apparatus is operating;
   a subsystem, implemented at least partially in hardware, configured to present the alternate content or skip the advertisement only when the apparatus is operating in a first operational mode rather than a second operational mode.

19. The apparatus as recited in claim 15, further comprising:
   a subsystem, implemented at least partially in hardware, configured to determine a user identifier for a current user of the apparatus;
   a subsystem, implemented at least partially in hardware, configured to present alternative content for and/or skip different advertisements for different determined user identifiers.

20. The apparatus as recited in claim 15, a subsystem, implemented at least partially in hardware, configured to select between presenting the alternative content or skipping over the advertisement based on data indicating whether a user of the multimedia device has paid a fee.

21. The apparatus as recited in claim 15, comprising a subsystem implemented at least partially in hardware and configured to, in response to identifying the advertisement, skip the advertisement.

* * * * *